United States Patent Office 3,642,650
Patented Feb. 15, 1972

3,642,650
PIGMENT PARTICLES AND METHOD OF PRODUCING THE SAME

Maurice Dwight McIntosh, deceased, late of Willoughby, Ohio, by Central National Bank, executor, Cleveland, Ohio, assignor to Day-Glo Color Corp., Cleveland, Ohio
No Drawing. Continuation-in-part of application Ser. No. 767,531, Oct. 14, 1968. This application Aug. 28, 1969, Ser. No. 855,462
Int. Cl. C09k 1/02
U.S. Cl. 252—301.2 R    30 Claims

ABSTRACT OF THE DISCLOSURE

A method of separating finely particulated discrete pigment particles from a continuous phase film forming base vehicle comprising admixing an amidealdehyde condensation product with a liquefied continuous phase film forming vehicle that is immiscible with such product and may contain a light-absorbing agent that is absorbed by the product and retained therein. The resultant mixture is subjected to agitation and time-temperature conditions sufficient to produce discrete, finely divided generally rounded and uniformly sized coalescent-resistant pigment particles. An agglutination-inducing liquefied vehicle having an effective Kauri-Butanol value of about 25 to 40 which is soluble in the liquefied vehicle and non-soluble with the pigment particles is then intermixed in an amount sufficient to produce a mixture of vehicles and revertibly-agglutinated particles. The particles are then separated from the mixture and are produced as a free-flowing powder or as wet pigment cakes. The separated particles can be readily re-dispersed in various ink and paint vehicles to regain their coalescent-resistance and other desirable characteristics.

---

This is a continuation-in-part application based on my sole copending application U.S. Ser. No. 767,531, filed Oct. 14, 1968 (now abandoned); and in part on my prior Ser. Nos. 196,860, filed May 21, 1962 (now abandoned) and 582,511, filed Sept. 28, 1966 (now Pat. No. 3,412,-036); and in part on prior applications Ser. No. 70,927, filed Nov. 22, 1960 (now abandoned); Ser. No. 274,791, filed Apr. 22, 1963 (now abandoned); Ser. No. 291,272, filed June 28, 1963 (now Pat. No. 3,412,104); Ser. No. 565,377, filed July 15, 1966 (now Pat. No. 3,412,034); and Ser. No. 572,684, filed Aug. 16, 1966 (now Pat. No. 3,412,035), said last five applications being filed jointly in my name and that of Zenon Kazenas and Joseph Lyman Switzer and disclosing in part certain of the materials hereof, although claiming subject matter separate and distinct from that here claimed. All of the applications are incorporated herein by reference.

The instant invention relates to fine particle production, methods of separating such fine particles from base vehicles and the resulting compositions thereof and/or comprising the same.

Although the instant invention may have application in a number of fields, it is particularly useful in the manufacture of color compositions containing resin pigments. Such pigments may be used in the production of coating compositions (i.e., including paints, printing inks, silk screen colors, etc.) having many useful properties. The pigments are formed of normally solid resins in particulate form having dissolved, dispersed or fixed therein a suitable coloring agent, which in the case of daylight fluorescent colors is a fluorescent dye dissolved or dispersed in the pigment in concentrations effective for daylight fluorescence (as more fully described, for example, in Switzer et al. U.S. Pat. No. 2,653,109; McIntosh et al. U.S. Pats. Nos. 3,412,034; 3,412,035; 3,412,036 and 3,412,104; and Zenon Kazenas U.S. Pats. Nos. 2,809,954 and 2,938,873, all incorporated herein by reference).

My aforesaid disclosures relate to the production of various pigment, ink, paint and/or color compositions containing a continuous phase of an organic solid-film-forming material and a dispersed phase of pigment particles and/or to portions of such compositions. These pigment particles may contain various selective light-absorbing agents. My aforesaid disclosed compositions have important advantages over more conventional color and/or pigment compositions in that the pigment particles are formed in situ of the compositions and are extremely fine and uniform without grinding, screening, grating or the like. The pigment particles formed in accordance with the teachings of my aforesaid disclosures are solid synthetic resin bodies of generally rounded or spheroidal shape in a generally sub-micron size range, being as small as about 0.01 micron and selectively retain various light-absorbing agents, i.e., daylight fluorescent dyes, inorganic pigment particles, etc. Such pigment particles are extremely stable within the compositions thereof and form stable dispersions wherein coalescence, agglomeration and/or agglutination of these very fine particles is resisted by various factors not fully understood in the art. The stability of such compositions is actually considered to be highly desirable by end users. Nevertheless, this advantage serves to complicate the problems of certain applications that are not compatible with the continuous phase material and of a manufacturer of such compositions when he desires to separate the pigment particles from the continuous phase for purposes of merchandising the pigment particles per se, in absence of other materials or of combining the particles with some other vehicles.

The instant invention resides in certain unique processes which afford unusual advantages of separating these very fine pigment particles from the continuous phase, without any significant subtraction from the ability of such particles to re-disperse again in a suitable varnish or other carrier used in inks or paints. The instant invention is thus predicated on advantages not only for the manufacturer but also for the end user in that the end user is afforded the economic advantages of being able to purchase only the pigment particles per se and/or such pigment particles in substantial absence of conventional continuous phase compositions or the like. The invention also affords the advantage of permitting the end user to purchase such pigment particles with or without color incorporated therein, so that end user may formulate the compositions containing such pigment particles to suit a variety of requirements. Additional advantages of purchasing pigment particles per se include advantages in connection with such matters as total inventory requirements, varieties of color type in the inventory requirements, and substantial elimination of certain problems which might be involved in the use of a particular or specific continuous phase vehicle.

The instant invention also provides for procedures of substantially completely removing the continuous phase or base vehicle that is initially required in carrying out the process of producing the fine generally rounded or spheroidal dispersible pigment particles. These particles, as initially produced in the continuous phase vehicle, are so fine that the removal of such particles from the vehicle is next to impossible, even using the finest pore size in filters or similar means for removing such suspended and dispersed fine particles. In the practice of the instant invention, it is believed that the so-called "dilution" treatment of the continuous phase vehicle in the manner hereinafter described effectively results in a nominal or temporary agglutination of the individually dispersed phase particles to an extent sufficient to permit the same to be separated from the resultant continuous phase by filtration, decanting, and similar procedures. In this manner, it is possible to provide selectively colored (or uncolored) pigment particles per se, as a material in the absence of any continuous phase. Such pigment particles may be handled and shipped as a dry powder to an ultimate user, who may then conveniently re-disperse such powdery material into the continuous phase vehicle that he prefers merely by nominal agitation without any particular complication. The end user is able to effect a substantially complete and substantially uniform dispersion of the dispersed phase particles wherein the previously mentioned temporary agglutinations have been completely broken down again and the particle size of the dispersed phase are those actually achieved in the initial preparation thereof.

It is therefore an important object of the instant invention to provide a method of separating fine particles from a continuous phase film forming base vehicle.

It is a further important object of the instant invention to provide an improved fine generally rounded or spheroidal colored pigment particles (with or without various selected vehicle continuous phase present, as in a slurry or filter cake).

It is also an important object of the instant invention to provide a method for the preparation of such fine particle compositions.

Other objects, features and advantages of the invention will be readily apparent from the following description of certain preferred embodiments thereof, although variations and modifications may be effected without departing from the spirit and scope of the novel concepts of the disclosure.

In general, the dispersed or dispersible phase component or resinous material used in the practice of the invention has preferential or selective absorption for the selective light-absorbing agent to be used, and is capable of being converted to a molten state (in the presence or absence of solvents and/or plasticizers which may be of the non-solvent or solvent type). Thus, dispersible resins which may be used include aromatic resins such as Resinous Polyol X–450: (—CHR'—CH$_2$—CHR"—CH$_2$—)$_x$ polyol polymer wherein R' is phenyl and R" is ethylol (Example 3 of the aforesaid Ser. No. 291,272) and Epon 1004 (a condensation polymer of epichlorohydrin and bisphenol-A (Example 4 of said Ser. No. 291,272); but preferably amidealdehyde condensation reaction products are used as the dispersible phase.

It is recognized in the art, as a matter of convenience, to consider the amide-aldehyde condensation reaction products as reaction products of the simplest aldehyde, i.e., (a) aldehyde with one or more so-called "resin-formers" each of which contains a plurality of reactive (i.e., aldehyde-reactive) H atoms or N atoms. Although progress is being made in the use of higher homologues of formaldehyde, e.g., acetaldehyde, prion-aldehyde, etc. and it will be understood that the latter are not precluded from use herein but that they are not understood to be particularly significant for the present purposes. Formaldehyde, hereinafter referred to as (a) or its equivalents are considered to be the primary source of connecting linkages between or among the resin-formers just mentioned. A combination of such resin-formers generally tend to lead to the superior "co-condensation" products herein (as compared to the so-called "homo-condensation" products of (a) and a specific resin-former). For the purposes of identifying the resin-former types, the following categories are useful and are often used herein:

(b) Compounds containing a plurality of reactive H atoms in heterocyclic —NH— groups, wherein each N is attached directly by a single bond to a C, which is in turn attached directly by a double bond to =O, =S or =N;

(c) Compounds containing a plurality of reactive H atoms attached to non-cyclic N groups, each such N being attached directly by a single bond to a C which in turn is attached directly by a double bond to =O, =S or =N; and (d) Compounds containing a plurality of reactive H atoms attached to an N, which N is attached by a single bond to a S which in turn is attached by a double (co-ordinate) bond to =O. Resin-formers (d) are readily recognized as including a mono-aromatic (i.e., toluene or benzene) mono-sulfonamide:

or a disulfonamide. Resin-formers (b) and (c) are capable of generic definitions simply by omission of the "heterocyclic" and/or "non-cyclic" language modifying the definition of the N groups to which the reactive H atoms are attached. In general at least two reactive H atoms are preferred in compounds (b) and (c). In theory, only two such reactive H atoms in the resin-forming molecule would be expected to react with (a) alone to give a thermoplastic resin (and resin-formers of such category are often referred to as "thermoplastic" resin-formers) and three or more such reactive H atoms in a given resin-forming molecule would be expected to react to give a thermosetting or thermoset resin (and are often so identified, although such *theory* is not necessarily invariably borne out in practice because of various other complications, e.g., steric hindrance, etc). Compounds of category (c) which contain a plurality of —NH$_2$ groups as previously defined may thus often be referred to as thermosetting resin-formers.

First of all, one of the ingredients used in the instant co-condensation reaction is the formaldehyde component (a), which may be formaldehyde or any derivative thereof such as paraformaldehyde, hexamethylene tetramine, or the like; or any formaldehyde donor such as, for example, trimethylol melamine, which might be used in a resin of the invention to contribute for the co-condensation reaction a formaldehyde component (a) as well as what will be described in detail hereinafter as a heterocyclic poly NH$_2$ ingredient (c). For the sake of simplifying this disclosure, it will be appreciated that from whatever source it may come, one of the essential ingredients in the instant condensate production is formaldehyde, and this essential ingredient will be referred to hereinafter merely as "formaldehyde" or ingredient "(a)." The remaining ingredients (b), (c) and (d), which will be described in detail hereinafter, will be referred to essentially as the individual resin-forming molecule (or mixture of such molecules), although it will be understood that in the case of any of these ingredients (b), (c) and/or (d), the ingredient (a), namely, formaldehyde, may have been reacted with such resin-former and the reaction product introduced as such into the co-condensation reaction in the manner described in further detail hereinafter. In other words, the essential ingredients in the form of formaldehyde per se and the resin-forming molecules per se, will be described as ingredients (a), (b), (c) and (d) as such hereinafter, purely for the purposes of simplifying the instant disclosure.

Zenon Kazenas U.S. Pats. Nos. 2,809,854 and 2,938,873 describe certain co-condensates of (a), (c) and (d), which are used herein, although aromatic co-condensates of (a), (b) and (d) [and/or sometimes (c)] apparently give best results herein in the formation of pigments having particularly useful properties.

One of the materials used in the practice of the instant invention is referred to herein as ingredient (b). Preferably the ingredient (b) is a cyclic ureide resin-former, i.e., a compound which contains a plurality of active H atoms attached to N atoms, as in one or more heterocyclic —NH—CO—NH— groups, wherein each —NH— group is attached directly by a single bond to a C atom which is in turn attached directly by a double bond to an atom selected from the class consisting of O, S and N. The subsequently listed compounds have counterparts wherein =S or =NH replace the =O; and all such compounds may be used as ingredient (b), but those with =O are preferred because of better stability with dyes used herein. Ingredient (b) is often (but not always) a thermoplastic resin-former when condensed by itself with the formaldehyde component (a). In fact, the condensation product of (a) formaldehyde and (b) dimethyl hydantoin is a known thermoplastic resin, described in the literature. Many of the other condensation products of formaldehyde and the materials of ingredient (b) are new resins. The present invention is, however, preferably directed to the production of fine particles formed of co-condensation products of (a) formaldehyde with ingredient (b) and ingredients (d) and/or (c). In this respect, such particles are preferably a pigment co-condensate of ingredients (a) with (b), (c) and/or (d), which preferably is a reaction product in which the resinous body or matrix may involve substantially co-reaction of formaldehyde (a) with each of a plurality of resin-formers (b), (c) and/or (d) to form an integral resinous co-condensate. The instant fine particles may be formed from "homo-condensates" of (a) and (b), (a) with (c) and (a) with (d). Substantially complete condensation of the reactants, which is the desired result, means that the entire resin body is a substantially integral, complex resin molecular structure in which substantially all of the co-reactants (a) and (b), (c) and/or (d) are united. In the present case, the better results are obtained if such amide-aldehyde condensates (or co-condensates) are formed from resin-formers, i.e., (b), (c) and/or (d), which include at least substantially about 10 mol percent of an aromatic resin-former and/or 10 mol percent of an acetylene urea resin-former, e.g., compounds of XXIX series (infra).

As indicated previously, the ingredient (b) is a resin-former with formaldehyde. Preferred compounds for use in the invention as ingredient (b) are the imidazolidine-diones, or hydantoins, typical members of which compounds include:

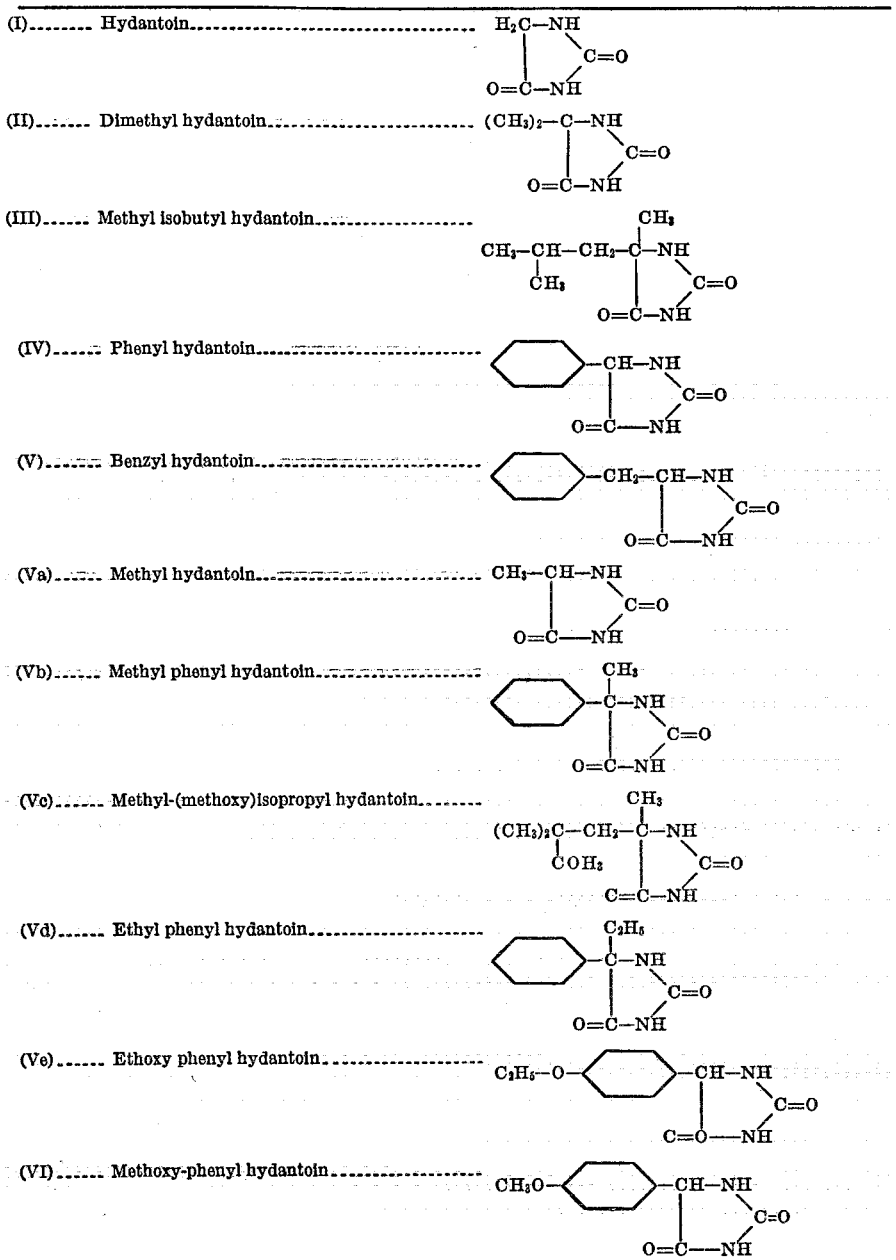

| | | |
|---|---|---|
| (VII) | Isopropyl-phenyl hydantoin | 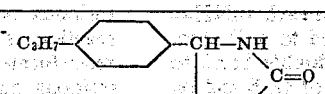 |
| (VIII) | Cyclohexyl hydantoin | 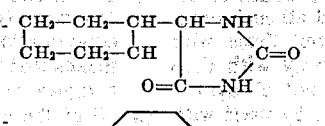 |
| (IX) | Methoxy-benzyl hydantoin | 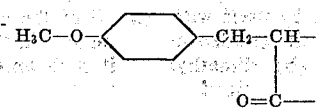 |
| (X) | Isopropyl-benzyl hydantoin | 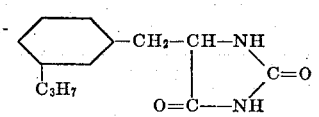 |
| (XI) | Benzyl methyl hydantoin | 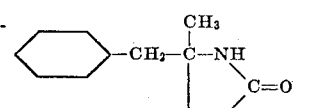 |
| (XII) | Methylcyclohexyl hydantoin | 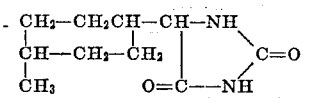 |
| (XIII) | Methoxycyclohexyl hydantoin | 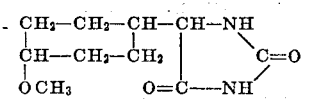 |
| (XIV) | Diphenyl hydantoin | 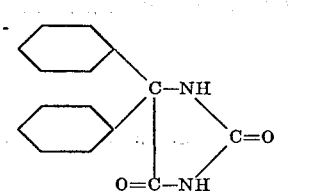 |
| (XV) | Phenyl benzyl hydantoin | 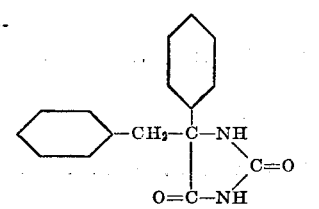 |
| (XVI) | Phenyl cyclohexyl hydantoin | 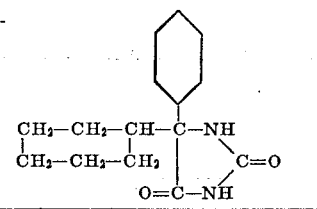 |

Hydantoin (I) and dimethyl hydantoin (II) are well known and available commercially. Other substituted hydantoins are known and/or readily prepared by the process of Bergs German Pat. No. 566,094 (December 1932). In general, any aldehyde or ketone may be used as a starting material. An aldehyde yields a mono-substituted hydantoin. A ketone yields a di-substituted hydantoin. Cyclic ketones carrying the keto groups as part of the ring form spiro-hydantoins.

In general, the preferred imidazolidinedione for use as ingredient (b) has the following formula:

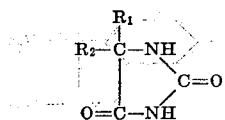

wherein $R_1$ and $R_2$ and H, alkyl, aralkyl, aryl or together represent a divalent alkylene (spiro) radical; and most preferably each $R_1$ and $R_2$ is selected from the group consisting of H, $C_1$–$C_4$ alkyl, phenyl, benzyl, and cyclohexyl radicals in which the only substituents on the phenyl, benzyl and cyclohexyl rings are $C_1$–$C_4$ alkyl and $C_1$–$C_4$ alkoxy.

In general, however, compounds which may be used in the practice of the invention as ingredient (b) comprise a compound which is a resin-former with formaldehyde and whose molecule contains (1) a five-membered ring in which there are at least two nuclear N atoms each having one H atom attached thereto and being attached to a nuclear carbonyl group, (2) at least two nuclear C atoms and (3) only N and C nuclear atoms in said ring. Preferably, also, the compound has only substituents on said ring that are inert to formaldehyde and consist of no atoms other than C, H, halo and ether, hydroxy and/or keto O atoms. Expressed in other terms the molecule has a plurality of —NH— groups each connected to a carbon atom in a heterocyclic five-membered ring, such carbon atom being in turn connected to an oxygen atom by a double bond, and such heterocyclic ring being a five-membered ring consisting of carbon and nitrogen atoms.

Still another class of compounds (b) useful in the practice of the invention which (like the hydantoins) contain a plurality of both keto and imido groups are known as the urazols, having the general formula:

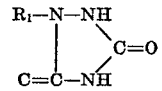

Typical compounds include:

| | | |
|---|---|---|
| (XXVIa) | Urazole | H—N—NH\C=O / O=C—HN |
| (XXVIb) | 1-phenyl urazol | ⌬—N—NH\C=O / O=C—NH |
| (XXVIc) | p-chloro-phenyl urazol | Cl—⌬—N—NH\C=O / O=C—NH |
| (XXVId) | p-Methyl-phenyl urazol | CH₃—⌬—N—NH\C=O / O=C—NH |

Other compounds useful as ingredient (b) include other members of the keto-imidazolidine family, such as:

| | | |
|---|---|---|
| (XVII) | Imidazolidinetrione (parambic acid) | O=C—NH\C=O / O=C—NH |
| (XVIII) | Imidazolone | HC—NH\C=O ‖ HC—NH |
| (XIX) | Imidazolidone (ethylene urea) | H₂C—NH\C=O / H₂C—NH |
| (XIXa) | Dihydroxy imidazolone (dihydroxy ethylene urea) | HO—CH—NH\C=O / HO—CH—NH |
| (XX) | Benzimidazolone (phenylene urea) | ⌬—NH\C=O / —NH |
| (XXI) | 4,5-tetramethylene imidazolidone | CH₂—CH₂—CH—NH\C=O / CH₂—CH₂—CH—NH |
| (XXII) | 5,5-pentamethylene hydantoin ¹ | CH₂—CH₂—CH₂ / CH₂—CH₂—C—NH\C=O / O=C—NH |
| (XXIII) | Phenly imidazolone | ⌬—C—NH\C=O ‖ H—C—NH |
| (XXIV) | Phenly imidazolone | ⌬—CH—NH\C=O / H₂C—NH |
| (XXV) | Isopropyl imidazolidone | C₃H₇—CH—NH\C=O / H₂C—NH |

(XXXVI) ......... Diphenyl imidazolidone ............ 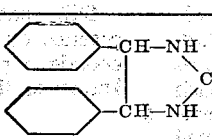

[1] Made by Bergs' process starting with cyclohexanone.

It will thus be seen that such compounds include compounds having in their molecule a five-membered nucleus composed of two intracyclic —NH— groups, one intracyclic carbonyl group therebetween and two remaining intracyclic C atoms, which two remaining atoms have substituents which are inert to formaldehyde in the resin forming reaction. Such substituents include $R_1$ and $R_2$ (previously defined) and also carbonyl, hydroxy or ether O atoms, phenyl and cyclohexane rings fused with the five-membered ring and the cyclic pentamethylene radical and other cyclic aliphatic bivalent radicals. All of such radicals are inert toward formaldehyde in the resin forming or co-condensation reaction of the invention, and need not be described in further detail since skilled resin chemists recognize this general class of radicals as being inert in this respect.

Also, included in the definition of ingredient (b) is a compound having the previously defined heterocyclic ring (with the two —NH— groups on either side of an intracyclic nuclear carbonyl group in a five-membered ring) where one of the atoms in the heterocyclic ring is C and the other is N.

Typical compounds of this class include:

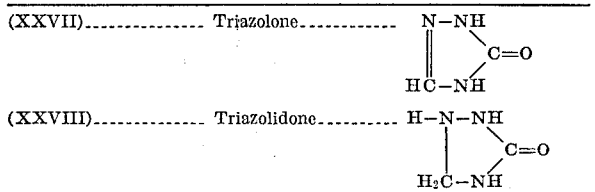

(XXVII) ............... Triazolone
(XXVIII) ............... Triazolidone

The substituted triazolidones have the general formula:

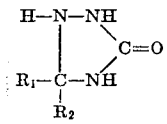

wherein $R_1$ and $R_2$ have the previously described definition.

As previously indicated herein, the ingredient (b) may contain a plurality of rings, e.g., two rings in compounds (VI) through (XIII), three rings in compounds (XIV) through (XVI), etc., including fused ring structures (XX), (XXI), etc. It will also be understood that preferably the molecule has a plurality of intracyclic —CO— groups in heterocyclic ring structures of ingredient (b); and also there may be more than two intracyclic —NH— groups attached to an intracyclic —CO— group of a heterocyclic ring, as in the case of (XXVIa) urazole. Moreover, certain unique advantages of the invention are obtained using, in or for ingredient (b), compounds of a certain group having the previously defined plurality of —NH— groups and having a plurality of the previously defined intracyclic —CO—groups as well as a plurality of the previously defined heterocyclic groups. Such compounds preferably include those which may be referred to as the poly-ureido group, with the parent compound being:

(XXIX) Acetylene urea (acetylene diurein or diureine, or glycoluril, or acetylene diurea):

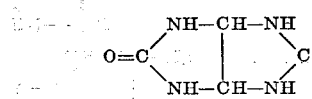

wherein it will be seen there are a plurality of intracyclic —NH— groups, each attached to an intracyclic —CO— group in a heterocyclic ring, with the compound (XXIX) containing a plurality of such —CO— groups as well as a plurality of such heterocyclic rings, in a fused ring structure. Acetylene urea (or diurea) is available commercially.

The bivalent —NH—CO—NH— group is referred to as the ureido (or carbamido) group. Certain of these compounds and their preparation are disclosed in Beilstein among other sources. In general, compound (XXIX) may be prepared by reaction of 1 mol of filyoxal with 2 mols of urea, perhaps along the lines of the following proposed reaction scheme (AA):

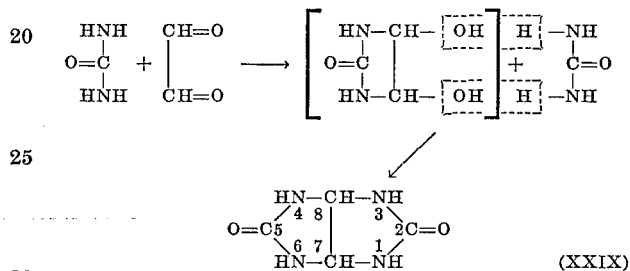

(XXIX)

The compound shown in brackets is merely proposed as a material which may or may not exist or may exist only in a transitory stage in such reaction scheme. Although it is not intended to limit the invention to any particular theory, the foregoing reaction scheme is helpful in connection with the synthesis of the compounds of this group. For example, prior reaction of urea with formaldehyde to obtain dimethylol urea for reaction with glyoxal seems to be helpful in tying up one reactive H atom on each amido N so that the cyclic ureido compound appears to be more easily formed as an intermediate, again presumably along the following reaction scheme (BB):

(XXIXa)

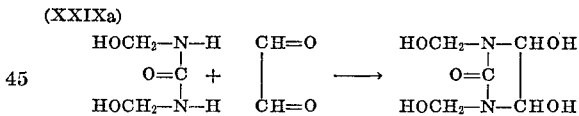

In the foregoing product (XXIXa) of scheme (BB), i.e., 1,3-dimethylol-4,5-dihydroxy-ethylene urea, it will be appreciated that the hydroxy groups are essentially inert or non-reactive vis-a-vis formaldehyde and are thus also included in the previously recited definitions of essentially inert carbonyl and alkoxy radicals containing O, e.g., in $R_1$ and $R_2$. Still other compounds of the poly-ureido group that may be used in the practice of the invention include:

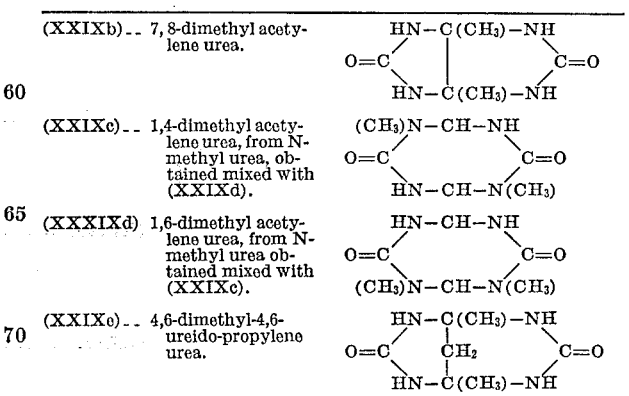

(XXIXb) .. 7,8-dimethyl acetylene urea.
(XXIXc) .. 1,4-dimethyl acetylene urea, from N-methyl urea, obtained mixed with (XXIXd).
(XXXIXd) 1,6-dimethyl acetylene urea, from N-methyl urea obtained mixed with (XXIXc).
(XXIXe) .. 4,6-dimethyl-4,6-ureido-propylene urea.

Beilstein suggests that in the preparation of the foregoing it is preferable to prepare the corresponding thiourea or thioureido compound and then hydrolyze to the corresponding urea or ureido; hence (XXIXb) is made via reaction between dimethyl glyoxal and thiourea; (XXIXc) and (XXIXd) are made, as initial mixture, via reaction between glyoxal and monomethyl thiourea; (XXIXe) is made via reaction between acetylacetone and thiourea; and so forth. The following compounds may also be prepared accordingly and used in the invention:

| | | |
|---|---|---|
| (XXIXf) | 1,4-diethyl acetylene urea (in mix with 1,6 isomer). | 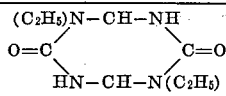 |
| (XXIXg) | 1,6-dibutyl acetylene urea (in mix with 1,4 isomer). | 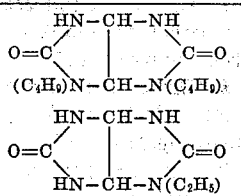 |
| (XXIXh) | 1-ethyl acetylene urea | 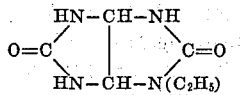 |

The following compounds also useful in the invention are made via initial mol for mol reaction of glyoxal and ethyl urea, followed by reaction with one mole of urea (or with thiourea counterparts).

| | | |
|---|---|---|
| (XXIXi) | 1,6-(di-2-chlorethyl) acetylene urea (in mix with 1,4 isomer). | 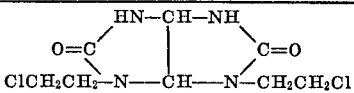 |

Using N-(2-chlorethyl) urea

| | | |
|---|---|---|
| (XXIXj) | 1,4-di-(2-methoxyethyl) acetylene urea (in mix with 1,6 isomer). | 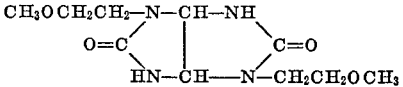 |

Starting with N-(2-methoxyethyl) urea

| | | |
|---|---|---|
| (XXIXk) | 1-acetyl acetylene urea | 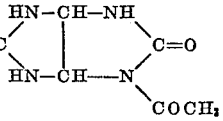 |

From acetyl urea per reaction system for (XXIXh)

| | | |
|---|---|---|
| (XXIXl) | 1,6-di-(2-carbethoxyethyl) acetylene urea (in mix with 1,4 isomer). | 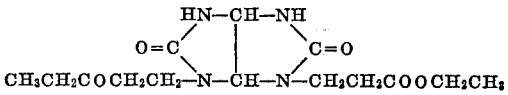 |

From N-(2-carbethoxyethyl)urea

| | | |
|---|---|---|
| (XXIXm) | 7-phenyl acetylene urea | 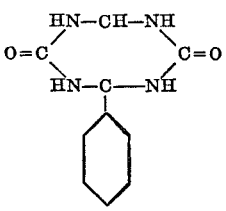 |

From phenyl glyoxal

| | | |
|---|---|---|
| (XXXIXn) | 7-methyl acetylene urea | 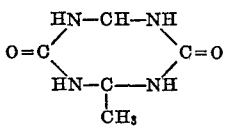 |

From methyl glyoxal

The corresponding propyl compound is made from propyl glyoxal.

| | | |
|---|---|---|
| (XXIXo) | 7-methyl-8-ethyl acetylene urea. | 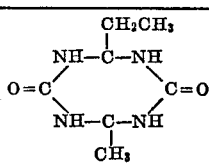 |

From methyl ethyl glyoxal

| | | |
|---|---|---|
| (XXIXp) | 7-methyl-8-amyl acetylene urea. | 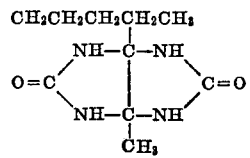 |

From methyl amyl glyoxal

| | | |
|---|---|---|
| (XXIXq) | 7-methyl-8-cyclohexyl acetylene urea. | 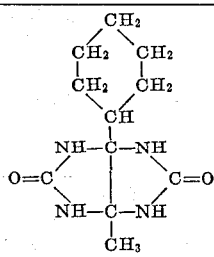 |
| | | From methyl cyclohexyl glyoxal |
| (XXIXr) | 7-methyl-8-sec.-butyl acetylene urea. | 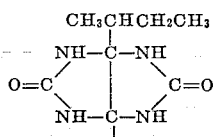 |
| | | From methyl sec.-butyl glyoxal |
| (XXIXs) | Bis-(7-methylene-acetylene urea). | 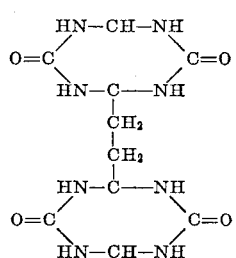 |
| | | From diglyoxal ethane with a total of four mols of urea |

From diglyoxal ethane with a total of four mols of urea.

As will be appreciated, a mixture of ingredients meeting the definition of ingredient (b) may be used, instead of a single compound, hence the terminology "at least one" that is used sometimes herein. The same is true of ing the definition of ingredient (b) may be used, instead detail hereinafter.

Another ingredient which may be used in combination with ingredients (a), (b) and (d), is a normally thermosetting resin former, i.e., a substance (c) whose molecule has a plurality of $NH_2$ groups each connected to a carbon atom in a heterocyclic ring, said carbon atom being connected by a double bond to an intracyclic nitrogen atom. Such compound (c) may be hereinafter referred to as a "heterocyclic polyamine" and the heterocyclic rings included include triazole, diazine and triazine rings. The compound (c) includes:

| | | |
|---|---|---|
| (XXX) | Guanazole | 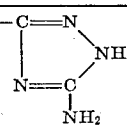 |
| (XXXI) | 1-phenyl guanazole | 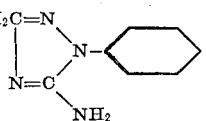 |
| (XXXII) | 4-aminoguanazole | 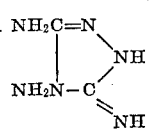 |
| (XXXIII) | 1-carbamyl guanazole | 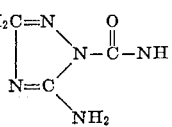 |
| (XXXIV) | 1-guanyl guanazole | 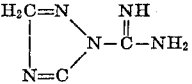 |
| (XXXV) | 1-acetyl guanazole | 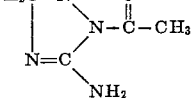 |
| or | | |
| (XXXVI) | 1-benzoyl guanazole | 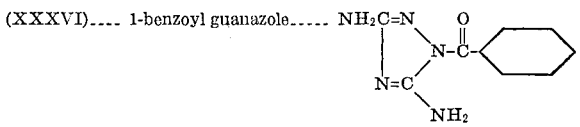 |

When the heterocyclic ring in a heterocyclic polyamine used in the practice of the invention comprises a diazine ring, the heterocyclic polyamine may be, e.g., a pyrimidine such as 2,4-diamino-6-hydroxy pyrimidine, (XXXVII),

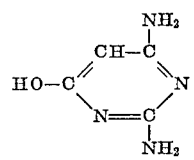

When the heterocyclic ring in a polyamine used in the practice of the invention comprises a triazine ring, the heterocyclic polyamine may be a substance whose molecule contains from one to three triazine rings, and has no reactive groups other than the amino groups. The term "reactive group" as used herein means any radical in a molecule of such a substance which may enter into undesirable side reactions that interfere with the reaction of formaldehyde with the amino triazine in the production of compositions of the invention (e.g., an OH group attached to a triazine ring may react with formaldehyde during the production of a thermosetting amino triazone-formaldehyde condensation product). A heterocyclic polyamine used in the practice of the invention that has one triazone ring in its molecule may be a triamino triazone, e.g., melamine, (XXXVIII),

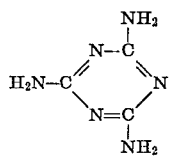

or a diamine triazine (i.e., a monoguanamine) having the general formula

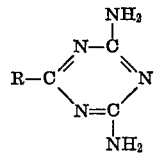

wherein R is a hydrogen atom, a saturated monovalent aliphatic hydrocarbon radical having from 1 to 18 carbon atoms, an aromatic hydrocarbon radical containing 1 benzene nucleus or containing 2 condensed benzene nuclei, a saturated or unsaturated cycloaliphatic hydrocarbon radical, or any of the foregoing radicals containing substituents such as aliphatic, cycloaliphatic, aromatic, alkoxy, aryloxy and acyl radicals. Thus, the monoguanamines used may have varying structures and may be of complex structure so long as they do not contain groups which interfere with the condensation reaction of formaldehyde with amino groups in the guanamine in the practice of the invention. Such monoguanamines include:

| | | |
|---|---|---|
| (XXXIX) | Formoguanamine | 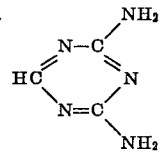 |
| (XL) | Acetoguanamine | 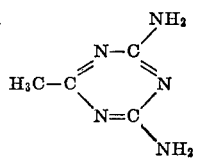 |
| (XLI) | Propioguanamine | 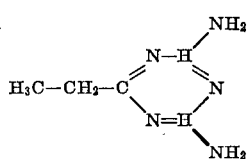 |
| (XLI) | Propioguanamine | 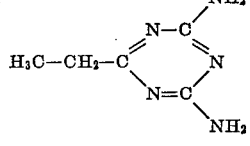 |
| (XLII) | Butyroguanamine | 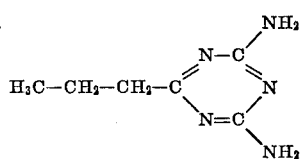 |
| (XLIII) | Benzoguanamine | 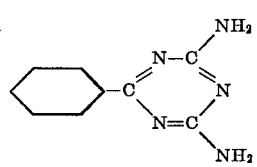 |
| (XLIV) | Phenylacetoguanamine | 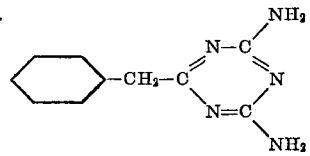 |
| (XLV) | Delta-cyano-valeroguanamine | 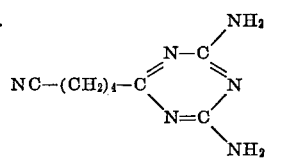 | and monoguanamines obtained from the corresponding mononitriles containing as many as 18 carbon atoms, e.g., dodecano-, tetradecano-, or octadecano-nitrile.

A heterocyclic polyamine used in the practice of the invention that has two triazine rings in its molecule may be a diguanamine having the general formula

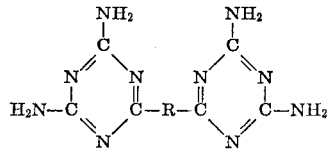

wherein R is a divalent hydrocarbon radical in which the shortest connection between the free valences is not more than 18 carbon atoms in series and which contains no substituents or contains substituents such as aliphatic, cycloaliphatic, aromatic, alkoxy, aryloxy and acyl radicals. R may also be a compound having said general formula that is substituted on not more than two exocyclic nitrogen atoms; the substituents consisting of (a') not more than two monovalent aliphatic hydrocarbon radicals on each substituted nitrogen atom, each having not more than four carbon atoms, each having at least one hydrogen atom attached to the same carbon atoms as the free valence, and each having not more than one unsaturation, any such unsaturation being an olefinic unsaturation in the beta-gamma position; (b') not more than one monovalent radical of the benzene series on each substituted nitrogen atom having not more than 8 carbon atoms in which the free valence is connected to the nucleus; and (c') not more than 1 mono-alkoxy phenyl radical on each substituted nitrogen atom having not more than 8 carbon atoms. Thus the diguanamines used may have varying structures and may be of complex structure so long as they do not contain groups which interfere with the condensation reaction of formaldehyde with the diguanamine in the practice of the invention. Such diguanamines include gamma-methyl-gamma-acetyl pimeloguanamine, (XLVI), wherein "R" above is:

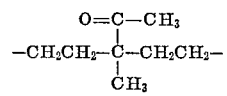

Other diguanamine compounds include:

(XLVII) ..... Sebacoguanamine ............ 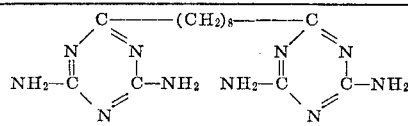

(XLVIII) .... Adipoguanamine ............. 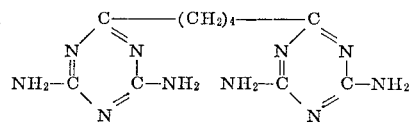

(XLIX) ..... Bis-(4,6-diamino-2-triazinyl-ethyl) fluorene. 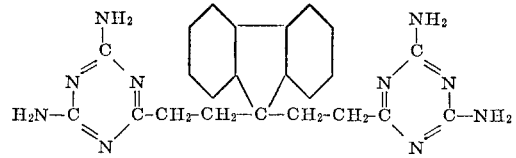

(L) .......... Gamma-isopropenyl-gamma-acetyl pimeloguanamine. 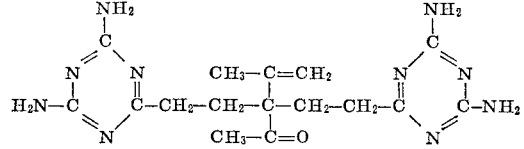

(LI) ......... Sym-diphenyladipoguanamine. 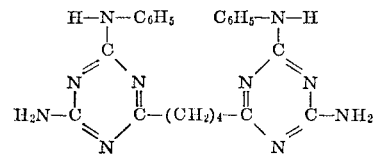

(LII) ........ Phthaloguanamine ........... 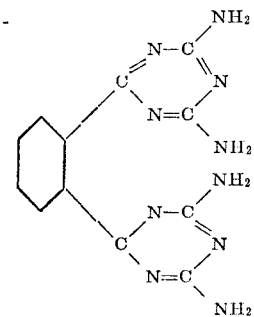

(LIII) ....... p,p'-Bis-2,4-diamino-6-triazinyl diphenyl. 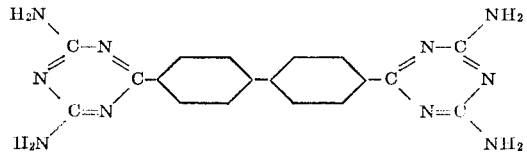

TABLE—Continued (LIV) ........ 1,2-bis-2,4-diamine-6-triazinyl naphthalene.

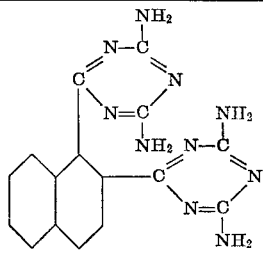

Also included are sym-diphenylsebacoguanamine, sym.-di-p-phenetyladipoguanamine, sym. - di-o-tolyladipoguanamine, terephthaloguanamine and diguanamines obtained from nitriles such as 2,4-dicyanodiphenyl, 4,4'-dicyanodiphenyl methane, 4,4'-dicyanodiphenyl ethane, and 4,4'-dicyanoalpha, gamma-diphenyl propane.

A heterocyclic polyamine used in the practice of the invention that has three triazine rings in its molecule may be a triguanamine such as gamma-2,4-diamino-6-triazinyl-gamma-phenylpimeloguanamine (LV):

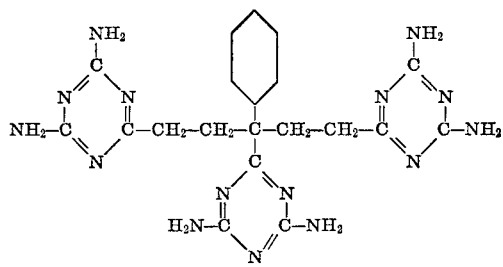

A guanamine which contains one or a plurality of 2,4-diamino-6-triazinyl radicals (e.g., a monoguanamine, diguanamine or triguanamine) may be prepared by condensing the corresponding mononitrile, dinitrile or trinitrile with dicyandiamide. The nitrile which reacts with the dicyandiamide must be a specific type of nitrile, namely, a nitrile whose molecule contains a cyano radical attached to a saturated carbon atom. In other words, the carbon atoms to which the cyano group is attached must not be unsaturated and must not become unsaturated under the reaction conditions. In a nitrile used in a reaction with dicyandiamide as described herein, a nuclear carbon atom in an aromatic ring structure (e.g., an atom in a benzene nucleus) is considered to be saturated.

A mononitrile or polynitrile which may be used in the preparation of a guanamine for use in the present invention may be the nitrile corresponding to a monocarboxylic acid or a polycarboxylic acid. For example, such acids include any normal aliphatic carboxylic acid in the series from acetic acid to octadecanoic acid; or in the series from malonic acid to octadecane 1, 18-dicarboxylic acid, any benzene carboxylic acid, or an aromatic carboxylic acid containing two condensed benzene nuclei or two benzene nuclei connected directly or connected by from one to twelve atoms in series. Also included are saturated or unsaturated alicyclic carboxylic acids, the dimer of linoleic acid, or an acid obtained by substituting in the molecule of any of the foregoing acids substituents such as aliphatic, cycloaliphatic, aromatic, alkoxy, aryloxy and acyl radicals. Examples of such nitriles include acetonitrile, propionitrile, butyronitrile, valeronitrile, stearonitrile, succinonitrile, glutaronitrile, pimelonitrile, adiponitrile, sebaconitrile, acelaonitrile, octadecanedinitrile, benzonitrile, phthalonitrile, terephthalonitrile, cyanonaphthalene, dicyanonaphthalene, 2,4'-dicyanodiphenyl, 4,4'-dicyanodiphenyl methane, 4,4'-dicyanodiphenyl, 4,4'-dicyanodiphenyl ethane, 4,4'-dicyanoalphagamma-diphenyl propane, 4,4'-dicyanodiphenyl ether, 4-cyanophenyl 4'-cyanobenzyl ether, 4,4'-dicyanodibenzyl ether; the ethers formed by the reaction of two molecules of a hydroxy benzonitrile (e.g., 4-hydroxy benzonitrile) with one molecule of the dibromide corresponding to a glycol in the series from methylene glycol to decylene or to diethylene or triethylene glycol; gamma-methyl-gamma-acetylpimelonitrile, gamma-isopropenyl-gamma-acetylpimelonitrile, bis - cyanomethyl fluorene, 4,4' - dicyanobenzophenone, phenylacetonitrile, gamma - cyano-gamma-phenyl-pimelonitrile, the dinitrile corresponding to the dimer of linoleic acid, and the unsaturated nitrile derived from oleic acid.

In the preparation of a guanamine by the condensation of a nitrile with dicyandiamide, widely different molar proportions may be used. However, in the preparation of a monoguanamine the preferred proportion ranges from about 1 mol to about 1.5 mols. of dicyandiamide for each mol of the nitrile (preferably a mononitrile). The best results are obtained when the molar proportion is about 1.2 mols of dicyandiamide for each mol of the nitrile. In the preparation of a diguanamine the preferred proportion ranges from about 2.2 to about 2.6 mols of dicyandiamide for each mol of the nitrile (i.e., a dinitrile) and the best results are obtained by using about 2.4 mols of dicyandiamide for each mol of the nitrile. Correspondingly, in the preparation of a triguanamine the preferred proportion of dicyandiamide is slightly greater than 3 mols (i.e., about 3.6 mols) for each mol of the nitrile( i.e., a trinitrile).

The condensation of a nitrile with dicyandiamide is carried out by dissolving a strongly basic catalyst in a suitable primary or secondary alcoholic solvent such as benzyl alcohol or ethylene glycol mono-methyl ether. Then adding the nitrile and the dicyandiamide in a proportion within the range hereinbefore described, and heating to start the reaction. The reaction is then continued by heating or cooling if necessary to keep the temperature between about 100° and about 180° C. to prevent the reaction from becoming too violent. The quantity of the alcoholic solvent used should be just sufficient to form a suspension of the precipitate so that it can be stirred during the reaction. When the precipitation of the guanamine is complete, the precipitate is filtered off and washed with boiling water to remove excess dicyandiamide and products of side reactions. The guanamine may be purified by converting it to a hydrochloride and neutralizing in an aqueous solution of the hydrochloride to liberate the guanamine.

This method of preparation is versatile in that a large variety of nitriles may be used for the reaction with dicyandiamide, to give a wide variety of guanamines.

The nitriles may be prepared by various methods. Dinitriles in which the cyano groups are separated by five carbon atoms in series, and in which the central carbon atom of the series is disubstituted, may be prepared by condensing acrylonitrile and a compound having an active methylene group, in the presence of a strong base. Other dinitriles may be prepared by reacting a polymethylene dihalide with sodium cyanide. Often it is convenient to prepare the nitrile by dehydration of the amide or directly from the carboxylic acid.

Diguanamines in which one or two of the exocyclic nitrogen atoms are substituted, as for example, sym.-diphenyl-adipoguanamine, hereinbefore mentioned, may be prepared by various methods. One method consists in reacting 1-phenyl biguanide, 1-o-tolyl biguanide, 1-m-tolyl biguanide, 1-p-tolyl biguanide, 1-(2',5'-dimethyl phenyl) biguanide, 1-methyl-1-phenyl biguanide, 1-p-phenethyl biguanide or 1-ethyl-1-phenyl biguanide with sodium carbonate and adipyl chloride or the dichloride of any other dicarboxylic acid in chlorobenzene. Another method consists in reacting any of the aforementioned aryl or alkyl aryl biguandines or 1-methyl biguanide, 1-ethyl biguanide, 1-propyl biguanide, 1-butyl biguanide, 1-alkyl biguanide, 1-crotyl biguanide, 1,1-dimethyl biguanide, 1,1-diethyl biguanide, or 1,1-diallyl biguanide, with the diethyl or dimethyl ester of adipic acid or any other dicarboxylic acid in the presence of an alkoxide catalyst. Still another method consists in reacting an alkyl or aryl dicyandiamide such as phenyl dicyandiamide with adiponitrile or the dinitrile of any other dicarboxylic acid.

Referring to ingredient (d) hereof, it will be recognized that this ingredient (d) is a thermoplastic resin-forming ingredient, namely, an aromatic sulfonamide, or monosulfonamide, such as p-toluenesulfonamide, o-toluenesulfonamide or mixtures thereof, or alpha-toluenesulfonamide or any one or a mixture of aromatic monosulfonamides having two reactive amide hydrogens. Such aromatic sulfonamides preferably have a sulfonamido group attached directly to the aromatic nucleus through the sulfur atom of the sulfonamido group. These compounds represent a well known class, many of which are commercially available, as individual ortho or paratoluenesulfonamide (or mixtures thereof), benzene sulfonamide and/or $C_1$–$C_4$ alkyl benzene sulfonamides, wherein the alkyl group is attached to the benzene nucleus, which compounds are called (d) herein.

The inclusion (d) of nominal amounts of benzene disulfonamide is not actually prohibited. The benzene ring may also have substituents (other than the sulfonamido group) which are preferably comparatively inert or (apparently) non-reactive toward formaldehyde under the conditions of resin formation. The benzene ring substituents (if any) are, of course, inert relative to the other resin forming ingredients present, i.e., (b), (c) and/or other (d) compounds and the coloring materials. In general, such other benzene ring substituents include those already defined for $R_1$ herein (i.e., alkyl, cycloaliphatic, aryl, etc. and/or oxygen in carboxyl, ether or hydroxyl groups). It will be understood that —OH and —$NH_2$ nuclear substituents (as in p-hydroxy benzene sulfonamide or p-amino benzene sulfonamide, i.e., sulfanilamide) qualify here as inert substituents presumably because, under ordinary mild reaction conditions here used, the sulfonamide-formaldehyde type reaction so dominates that there are no apparently undesirable side-reactions of the phenolformaldehyde or aniline-formaldehyde category (which might possibly be involved because of nuclear —OH or —$NH_2$ benzene substituents) and side-reaction participation, if any, resulting from such nuclear substituents does not interfere with the desired results obtained in the practice of the invention.

The agglutination-inducing liquefying vehicle is generally an organic aliphatic petroleum distillate or a mixture of such distillates. This agglutination-inducing vehicle is substantially soluble with the continuous phase or base vehicle and substantially non-soluble with the dispersed phase pigment particles. The agglutination-inducing liquefied vehicle is substantially water-free and generally has an effective KB value in the range of about 25 to 40 and preferably the KB value of 30 to 32. This vehicle is described as "agglutination-inducing" since it appears to function by temporarily modifying or altering the coalescent-resistant characteristic of the fine discrete pigment particles formed from intermixture (under agitation and time-temperature conditions) of the aforesaid condensation products and the liquefied base vehicle (continuous phase organic solid film forming material such as film forming alkyds, for example oil-modified alkyds, styrenated alkyds and other alkyds such as those described in U.S. Pats. Nos. 2,919,253 and 2,944,991; other varnishes, drying oils, polyethylene resins and other similar compositions for forming coating films and self-sustaining bodies consisting of vehicle binders which are not solvents for the dispersed phase pigment particles and are convertible to a solid state as set forth in my aforesaid U.S. Pats. Nos. 3,412,034; 3,412,035; 3,412,036 and 3,412,104) immiscible with such product. The modification of this particular pigment particle characteristic manifests itself by imparting temporary revertible-coalecence characteristics to such particles and allows the particles to be separated from the base vehicles thereof. The term "agglutination" is utilized herein and in the claims to signify a state wherein suspended or dispersed particles are caused to form larger masses, i.e., flocculate, without marked change of individual characteristic or loss of individual identity; which larger masses are then removed or rendered removable from the continuous phase carrying such dispersed particles. Thus, the term "agglutination-inducing vehicle" signifies a vehicle capable of at least temporarily causing dispersed particles to form larger masses without a marked change of characteristic or loss of identity of the individual particles, or any other undesirable effect, such as for example, causing precipitation of the base vehicle (continuous phase film forming vehicle).

Utility of a particular vehicle as an agglutination-inducing liquefying vehicle is determined by at least two convenient and reliable means. The first, as indicated hereinbefore, comprises determining the KB value of the particular vehicle being considered. The effective KB value should be in the range of about 25 to 40 and preferably in the range of 30 to 32. The KB (Kauri-Butanol) value is a conventional measure utilized to indicate "solvent" power. The numerical KB value of a particular "solvent" is the number of milliliters of that "solvent" that is required to cause cloudiness when added to 20 grams of a solution of Kauri gum in butyl alcohol. A standardized solution of Kauri gum and butyl alcohol is prepared in proportions of 100 grams of Kauri gum in 500 grams of N-butyl alcohol. In other words, and more generally, the KB value refers to the quantity, by volume, of the "solvent" (agglutination-inducing liquefying vehicle) under consideration which can be added to a standardized Kauri gum solution before such solution just fails to be a solvent for the Kauri gum. One extremely convenient (although somewhat subjective) means of determining the end point or KB value is to add the solvent under consideration to a flask containing a standardized solution of Kauri gum until No. 10 print (i.e., ordinary newspaper print) can no longer be read when the print is placed under the flask. Of course, other more objective means of determining a KB value are also available; for additional details reference is made to the procedure set forth in A.S.T.M. D–1133.

A second means of determining the utility of a particular liquefiable vehicle as an agglutination-inducing vehicle in the practice of the invention comprises determining the "solvation" power of the vehicle under consideration. The vehicle under consideration must just sufficiently solvate the vehicle base (resin) or continuous phase film forming material without causing the precipitation thereof. The end point is determined when addition of more vehicle (agglutination-inducing) causes a precipitate of the film forming vehicle resin or continuous phase to be formed. The proper end point is attained when the agglutination inducing vehicle under consideration fails to precipitate the continuous phase film forming material but temporarily flocculates (or causes the formation of temporary larger masses of) the pigment particles. Insufficient addition of the solvent fails to cause the desired revertibly-coalescent characteristics in the dispersed pigment particles while too great an addition causes the continuous phase film forming material to precipitate. As will be appreciated, the KB value and/or the solvation power of an organic generally hydrocarbon aliphatic liquefiable agglutination inducing vehicle can be adjusted by intermixing other compatible chemical substances therewith. Typical examples of liquefiable agglutination-inducing vehicles utilized to practice the invention include mineral spirits (KB value of about 33); hexane (KB value of about 31.4); Isopor G (a registered trademark for a narrow cut of isoparaffinic hydrocarbon petroleum fraction having a boiling range of about 160° to 180° C. and a KB value of about 28); Varsol 1 (KB value of about 38), Varsol 3 (KB value of about 36), Varsol 4 (KB value of about 35), Varsol 5 (KB value of about 35); (Varsol 1, 3, 4 and 5 are trade names for various fractions of aliphatic petroleum distillates). Also included is Polar 40 (a trade name for a naphthenic oil having a KB value of about 33.5) and other liquefiable (as by heating) non-aqueous chemicals that are substantially soluble to the continuous phase film forming vehicle and substantially non-soluble for the dispersed phase pigment particles.

In order to more fully illustrate the invention, the following examples and demonstrations are set forth hereinbelow, which are understood to be merely exemplary of and not limiting the scope of the invention.

EXAMPLE 1

A suitable reaction container is provided with conventional means for heating the contents thereof up to about 200° C. and with a conventional high speed disperser. 25 milliliters of water, 1 gram of potassium tetraborate, 24.6 grams of 91% paraformaldehyde, 16.4 grams of melamine and 44.8 grams of mixed o- and p-toluene-sulfonamide are charged into the container and mixed together with heating to about 102° C. Then, 65 grams of a continuous phase film forming vehicle comprising a vinyl toluene modified alkyd (60% solids with 25% vinyl toluene modification) are added. The agitation and heating are continued. The temperature is allowed to rise, with continuous stirring, to about 100° C. in order to attain a substantially incompletely reacted amide-aldehyde condensation product, which is referred to for identification herein as product X–1 (although in certain more general discourse hereinafter all such reaction products are referred to simply as product X). During this period of continuous heating and stirring, 11.9 grams of Rhodamine B base are added as a selective light-absorbing agent.

The heating and stirring are continued until a temperature of about 135° C. is attained and then 10 milliliters of Polar 40 (previously identified) is added and mixed into product X–1. Heating and stirring are continued until 150° C. is attained and then 40 milliliters of Varsol 5 (previously identified) are added and mixed into the product X–1. The resultant admixture is briefly held at this temperature, i.e., 150° C. for a few minutes until the initial product X–1 has advanced substantially as evidenced by a substantial reduction of volatiles given off from the admixture, in order to form a resultant dispersion X–1 (again, a more generic term of dispersion X is utilized hereinafter for additional convenience in further discourse).

The temperature is then reduced to about 135° C. with continued stirring, and is added to about 800 milliliters of a liquid vehicle, identified herein as vehicle X–1 (and generically as vehicle X) is then added. Vehicle X–1 is a mixture of 7 parts of Varsol 5 and 1 part of Isopar G. The effective KB value of vehicle X–1 is about 34.1. The mixture of dispersion X–1 in vehicle X–1 is then stirred to insure formation of a substantially uniform mixture and then allowed to settle. The dispersed pigment particles settle out of the liquid mixture and the liquid mixture is decanted. The separated revertibly-coalescent pigment particles are then washed with two washings of about 400 milliliters of Varsol 5 and filtered.

Upon close examination, it is found that the pigment particles in the resulting filter cake are of submicron substantially uniform size cut or range of about 0.1 to 0.6 micron as described in the aforesaid prior applications referred to herein.

The resulting filter cake is readily re-dispersible in conventional printing ink and/or paint vehicles as a substantially insoluble dispersed phase, wherein the discretely finely divided pigment particles retain their coalescent-resistant characteristic. The resulting filter cake can also be used to produce a flushed color for paints and/or printing inks. The resulting filter cake may, if desired, be dried and when the dried cake is removed, it is found that the cake crumbles very readily to form a dry, fine pulverulent pigment particle powder or material that is usable in printing inks and/or paints.

Pigment particles of such submicron size range cannot be separated by any conventional filtration methods from any conventional ink and/or pigment vehicles. Nor could such submicron particles be separated from the above-mentioned dispersion X of this example, merely by conventional filtration or the like. It is believed, but not fully understood, that after the previously described repeated additions or dilutions with vehicle X, a sufficient amount of tentative agglutination of the pigment particles takes place so as to permit a recovery of a substantial majority of such pigment particles by conventional filtration methods just described. Such agglutination would not normally be described as a true coalescence of the pigment particles, which are in a solid state during substantially all of the aforesaid dilution process. In other words, the dispersed phase pigment particles are understood to be effectively solidified at least by the time the initial 800 milliliters of vehicle X are added to the dispersion X to the consequent temperature drop. It is believed that by maintaining the various vehicles in the reaction system, i.e., the continuous phase film forming vehicle and the agglutination-inducing vehicle, in a liquefied state (as by heating) a substantial amount of shearing or the like of the pigment particles takes place allowing the formation of the substantially uniform submicron size range. Such uniformity of particle shape and size is not attainable through conventional impact grinding or the like and is also not possible in certain other processes of forming pigment particles wherein such particles are removed from the continuous phase substantially at the time of their formation whereby a relatively large size range is attained.

It will be appreciated that the product X herein described is prepared by carrying out an initially limited amount of condensation of the amide-aldehyde reactants, in order to obtain only an initial (i.e., A-stage) aromatic condensate which is substantially water-insoluble in the condition described, i.e., as the temperature has risen to about 102° C. in the preparation of such product X. In the substantially incompletely condensed condition of the instant aromatic monosulfonamide-heterocyclic poly $NH_2$-formaldehyde condensates, it is found that the material is often capable of taking on some water as a nonsolvent plasticizer (if substantial water is present and the conditions are favorable toward such phenomena, i.e., the temperature is low enough, etc.). Under the operating conditions described herein, however, the temperature employed is above 100° C. during substantially the entire period of condensation advancement after the admixture. It will therefore be appreciated that the condensation is actually carried out under conditions which are unfavorable toward retaining water in the dispersed phase of the dispersion X (although it will be appreciated that the particular continuous vehicle X may possess high water retention).

Comparable results are obtained herein by substituting equivalent molar proportions of other aromatic sulfonamides (d) for reactant (d) here used, i.e., mixed o- and p-toluenesulfonamide; and/or equivalent molar proportions of such poly $NH_2$ resin-formers as (XXX) through (LV) hereof for the melamine here used.

In addition, it will be appreciated that the very fine pigment particles that are obtained in the dried agglutinated form in accordance with the procedure described in the instant Example 1 may readily be reduced to a very fine pigment particle size in the manner already described. A free-flowing particulate material is thus obtained actually capable of use per se as a decorative particulate coloring material, having the characteristic generally rounded spheroidal particulate form of essentially transparent (and optically clear when no dyes are present) solid dispersed phase resin bodies, which may contain dissolved, dispersed or fixed therein the dye or other selective light-absorbing agent. The dye or selective light-absorbing agent is at least in part and probably substantially located within the solid interior of such fine pigment particles and carries out its daylight fluorescent function within such otherwise substantially transparent generally spheroidal solidified resin body particles.

In connection with the continuous phase film forming base vehicle used, it will be appreciated that the vinyl toluene modified alkyd described has substantially economical advantages as well as the capability of producing superior results in the practice of the invention. Other continuous phase film forming systems generally characterized by a solid content of at least substantially about 40% by weight and preferably at least substantially 50% by weight, all of which are substantially insoluble in and substantially immiscible with the dispersible phase (particularly in its molten condition) are capable of use herein. Such continuous phase systems are generally relatively high molecular weight chemicals (i.e., viscosity-inducing vehicles) that tend to impart substantial viscosity to the phase mixture during the formation of dispersion X, i.e., the "solids content" (the high molecular constituents) function to impart this viscosity. Of course, the continuous phase film forming material is functionally substantially chemically inert toward the dispersed phase as well as inert chemically with respect to the heat used in the instant process under the time-temperature-pressure conditions herein described. Examples of additional continuous phase film forming vehicles are more fully described in the aforesaid applications incorporated herein by reference.

The method of the invention may, therefore, be expressed in method terms, as a process of producing discrete finely divided particulate materials adapted for use as a carrier for a selective light-absorbing agent in inks and paints, which comprises the steps of (1) bringing into contact (x) a water-insoluble amide-aldehyde condensation product dispersible phase, as a synthetic resinous material in a liquefied state, and (y), as a continuous phase for (x), a substantially immiscible liquefied water-free film forming vehicle (preferably having at least substantially 40% solid contents by weight); (2) subjecting such admixture of phases to agitation, under conditions wherein such phase (x) is molten and such phase (y) is essentially liquid, (so that both phases (x) and (y) are in a liquefied state) in combination with time-temperature conditions sufficient to effect the formation of discrete, finely divided generally rounded uniformly sized dispersed phase solid particles characterized essentially by coalescent-resistance under ambient conditions; (3) intermixing an agglutination-inducing liquefied vehicle (having an effective KB value in the range of about 25 to 40) that is substantially soluble with (y) the liquefied film forming vehicle and substantially non-soluble with the particles, with said phase mixture to produce a mixture of vehicles and revertibly-coalescent particles; and (4) separating at least a portion of the revertibly-coalescent particles from said vehicles whereby the separated particles are solids that are readily dispersible in solid-film-forming organic continuous phase liquid paint and ink vehicles as a substantially insoluble dispersed phase in substantially the aforesaid finely divided discrete essentially coalescent-resistant condition. As will be appreciated, steps (1) and (2) may be performed, at least in part, simultaneously and steps (2) and (3) may likewise be performed, at least in part, simultaneously.

EXAMPLE 2

A container that is provided with conventional means for heating the contents thereof up to about 200° C. and a conventional high speed disperser for the contents, is charged with 20 grams of water, 1 gram of borax (decahydrate) and 1 drop (approximately 0.08 gram) of 70% aqueous phosphorous acid and mixed with heating to about 90° C. There is then added with stirring and heating, successively, 24.7 grams of 91% paraformaldehyde, 16.4 grams of melamine and 44.4 grams of a mixed o- and p-toluenesulfonamide, to obtain a substantially homogeneous product X–2 at about 90° C.

To such product X–2 at about 90° C. there is added 90 grams of vehicle X–2 (consisting of about 58% solids of a styrenated alkyd resin [resin component of Cycopol 341–17] in Magie Oil 535, [a high boiling aliphatic petroleum fraction characterized by a boiling point of about 526° to 595° F., a Kauri-Butanol value of 27, a flash point of 285° F. and a specific gravity of 0.845], and 40 grams of Holland Color & Chemical Company W76 gloss gel varnish [a proprietary product for a film forming vehicle used with lithographic inks]) with continuous agitation and heating. When the product X–2 is emulsified in vehicle X–2 (as evidenced by the formation of a substantially clear film from a sample thereof in accordance with conventional procedure), there is added with stirring at about 95° C., 4 grams of calcium stearate followed by 9.75 grams of Rhodamine B base. The resulting dispersion is taken up to about 145° C. with stirring at which time an addition of 5 grams of tung oil is thoroughly dispersed therein. The resulting dispersion X–2 is cooled to room temperature.

A charge of 150 grams of the foregoing dispersion X is thoroughly dispersed in (and diluted by) a mixture of 350 cc. of iso-octane and 500 cc. of heptane. The resulting mixture is allowed to stand, with settling, and the top predominantly solvent portion is decanted. The residue is additionally dispersed in (and diluted by) 300 cc. of heptane with stirring, and again allowed to settle. The solvent portion is again decanted and, once more, the residue is dispersed in an additional 300 cc. of heptane, allowed to settle and the liquid portion decanted.

As described in the previous Example 1, the dispersed phase initially obtained in dispersion X–2 hereof is composed of very fine discrete rounded or generally spheroidal particles, in substantially the very fine "cut" or size range previously described. Particles of such very fine sizes in the dispersion X–2 of this example apparently possess the ability to remain in an essentially stable coalescent-resistant dispersion, without coalescence, or even without nominal "agglomeration". It is believed that the stability of such dispersion X–2 is due at least in part to an apparent ability of continuous phase molecules or comparably minute components to achieve some sort of filming and/or orientation specific to these extremely fine discrete dispersed phase particles in the aforesaid dispersion X–2. It has been found, however, that whatever phenomenon may be involved in substantially stabilizing the aforesaid dispersion X–2, the dilution of the continuous phase film forming system initially present in dispersion X–2, by the selective agglutination-inducing solvent materials described in this example results ultimately in what constitutes a destruction of the original stability in the dispersion X–2, perhaps by dilution, solvent removal and/or effective reorientation of continuous phase molecules and/or components immediately adjacent the dispersed phase particles. In any event, such dilution of the continuous phase in the aforesaid dispersion X–2, in the manner described in this example, permits the dispersed phase particles to undergo settling or separation from the resulting diluted continuous phase. After the described repetition of such dilution or washing, and usually with resultant drying to remove substantially the resultant diluted continuous phase film forming material (drying at temperatures below the normal melting or softening point for the dispersed phase particles), one obtains a generally dry collection of dispersed phase particles which have undergone nominal agglutination, to the extent that such dispersed phase particles do appear to have some adherence. In the condition of such agglutination just described, however, the resulting dispersed phase particles may be readily broken down, and/or crumbled to a very fine easily handleable free-flowing powder. Such dispersed phase is readily re-dispersed in a wide variety of conventional printing ink and/or paint vehicles to obtain again substantially the generally discrete rounded or spheroidal dispersed phase particles of substantially the fine particle size and fine size "cut" hereinbefore described in connection with the dispersion X-2 obtained in the instant example.

It will be appreciated that the previously described sequence of dilution steps with the selective agglutination-inducing diluent and/or solvent for the continuous phase of the original dispersion X-2 (or dispersion X) results essentially in a dispersed phase particle collection containing primarily the relatively volatile residual portions of such solvent and/or diluent. The dried particles are thus obtained comparatively easily by volatilization of the solvent or diluent. On the other hand, filtration may be used for assistance in separation of the dispersed phase particles, once sufficient dilution of the continuous phase has been carried out to afford the previously described agglutination thereof. It will thus be appreciated that the manner of physical separation of the dispersed phase particles, after such agglutination affords various alternatives (i.e., filtering, decanting, etc.), and that in certain instances it is not necessary to completely remove the diluent or solvent but that the moist filter cake of pigment particles may be re-dispersed into appropriate paint and/or ink vehicles. In fact, in certain applications, this is the preferred procedure.

These procedures are believed to be made possible by the aforesaid dilution effect upon the stability of the initial dispersion X. On the other hand, it will be appreciated that during the formation of an initial dispersion (x), the relative conditions of the dispersible and continuous phases are different. A shearing effect is obtained apparently on the basis of correlation of certain factors which include the relative viscosities of the two phases (which are, in turn, based upon such factors as the melting and/or liquefaction temperatures of the dispersible phase and the high solids contents in the film forming continuous phase vehicle). The resulting dispersion (x) will thus possess a dispersible phase which has undergone sufficient heating, agitation, particle size breakdown in a molten state, advancement of condensation (preferably) and other phenomena here involved to the extent that the particles are rendered substantially coalescent-resistant. The dispersed phase particles in the aforesaid dispersion (x) will not undergo coalescence under the ordinary ambient conditions of use and/or the ordinary conditions of ambient temperatures. The dispersed phase particles at the ordinary conditions of ambient temperatures, e.g., at room temperature for dispersion (x) will thus not undergo coalescence such as to lose the previously described discrete generally spheroidal or rounded fine particle size identity. The subsequent dilution steps which are described herein, as well as in the previous Example 1 and subsequent examples, do not actually disturb the essentially coalescent-resistant character or identity of these minute dispersed phase particles. The agglutination referred to herein is primarily a type of physical adherence of such dispersed phase particles (under conditions which do not involve essentially the fundamental loss of the previously described fine particle identity, for the reason that re-dispersion is readily effected in printing ink and paint vehicles of the type described herein). The distinction between coalescence and agglutination herein is thus apparent, in that the undesirable coalescence involves a substantial combination of, perhaps, a multiplicity of the previously identified discrete fine particles of the dispersed phase in dispersion (x) so as to form a new substantially large particle combinations (i.e., spheroidals or re-dispersion-resistant clusters). Coalescence would ordinarily take place most easily with regrouping of liquid globules in adequately dispersed and/or reduced into fine particle sizes; whereas agglutination, as here used, involves essentially only nominal "physical" adherence among the small spheroidal particles only to the extent necessary to facilitate physical separation thereof from the diluted continuous phase (without loss of coalescent-resistant function) and without change of form or loss of identity. The substantial immiscibility between the two phases is thus significant from the time of initial contact (admixture and emulsion), through formation of the dispersion, and during the various stages of dilution (when the diluted continuous phase must have no significant solvent effect on the dispersed phase).

EXAMPLE 3

It will be appreciated that, although it is often preferred to carry out the process of the invention so that there will be substantial advancement of the condensation reaction during the formation of a dispersion X, normally solid thermoplastic resins (i.e., functionally "meltable" for dispersion formation) may be used in procedures which will involve the use of such resins as a product X, in a dispersed molten condition, during the formation of a dispersion X. Such molten condition of thermoplastic resins may be achieved by the combined effect of heating and agitation as described in previous Examples 1 and 2, with or without additional effect of selective solvents. In order to facilitate the conversion of the molten state by the use of ordinary heating and agitation in the process of the invention, a substantially condensed normally solid thermoplastic preformed resin which is to be used as a product X in the process of the invention is preferably reduced to fine particle size by grinding before it is brough into contact with the selected continuous phase vehicle.

For example, using the relative proportions of product X to vehicle X, and the operating conditions described in Examples 1 or 2, it is found that essentially the only procedural difference required in connection with the use of thermoplastic normally solid (and correspondingly substantially condensed) resins involves the final stages of dispersion formation. During this final stage, heating with agitation is ordinarily carried on up to a temperature of substantially 175° to 200° C. in order to impart substantial fluidity to the molten dispersed phase resin (herein used) and obtain the desired shearing effect thereon by the continuous phase.

Typical procedures for the preparation of various normally solid thermoplastic re-meltable resins which are used in the practice of the instant invention produced according to the following demonstration are shown below:

Demonstration A (1) An initial charge of 4.5 mols of water, 2 mols of dimethyl hydantoin (b), and 2.7 mols of paraformaldehyde (a) is heated to 90° C. to obtain a homogeneous reaction mass, into which is first dispersed ½ mol of paratoluenesulfonamide (d) and then dispersed ½ mol of benzoguanamine (c), to obtain a homogeneous reaction mass at about 90° C.[1]; and the reaction mass is then heated with stirring to 205° C. and maintained there until co-condensation is completed. After cooling, a clear friable thermoplastic resin (A-1) is obtained, which may be readily reduced to pigment size particles by grinding.

---
[1] At substantially 90–100° C. an initial incompletely reacted condensate is obtained; and optionally, about 1% Rhodamine B Extra may be dispersed therein at this stage, before further advancement of condensation.

(2) Comparable resins are prepared using in the foregoing procedure the following formulations:

| Resins | | Mols | | |
|---|---|---|---|---|
| | | A-2a | A-2b | A-2c |
| (a) | Paraformaldehyde | 2.7 | 2.7 | 2.7 |
| (b) | {Dimethyl hydantoin | 0.5 | 0.5 | |
| | {Acetylene urea [1] | 0.5 | 0.5 | 0.7 |
| (c) | Benzoguanamine | 0.5 | | |
| (d) | Paratoluene-sulfonamide | 1.5 | 2.0 | 2.3 |

[1] (Although the 5-membered heterocyclic rings are preferred in the molecular structure of the polyheterocyclic compounds of group (b), the acetylene urea is preferred among the polyheterocyclic compounds (XXIXa) through (XXIXs), it will be understood that comparable results are obtained using others of compounds (XXIXa) through (XXIXs) in the corresponding molar ratio in place of the acetylene urea in the above formulation).

Common chemical structural features of preferred compound (b), such as dimethyl hydantoin and acetylene urea, are that they both have 5-membered heterocyclic rings (containing such —NH— groups), at least one such ring containing three C atoms and two N atoms in the nucleus, a plurality of intracyclic —CO— groups and intracyclic —C—NH—CO— groups (although one of the C atoms in hydantoin is common to both such groups); and both contain at least one ureido group, with a pair of such —NH— groups in a single ureido (i.e., unsubstituted) group. The plural heterocyclic structure of acetylene urea is, of course, a distinction.

(3) Separate portions of the resulting resins (A-1, A-2a, A-2b and A-2c) are re-melted to about 180–190° C. and 2% of the weight thereof Brilliant Yellow 6G base is added thereto (and thoroughly dispersed therein), and upon cooling and grinding to fine particle size, it is found that in each case a bright yellow pigment is obtained.

(4) The procedure of the foregoing paragraph is repeated for each resin except that the coloring material added is 1% of the weight of the resin of Rhodamine B Extra (instead of the Brilliant Yellow 6G base) and the resulting product is a magenta pigment.

(5) The procedure of the previous paragraph is repeated for each resin except that (in place of the Rhodamine B Extra) the coloring material added is 1% of the weight (of the resin) of Xylene Red B and 1% Brilliant Yellow Acid 8G, and the result is a bright orange-red pigment.

(6) It will be appreciated that in the case of any of the previously described thermoplastic resins, the coloring material may be added after the initial recovery of the friable resin itself (by the re-melting process just described), or the coloring material may be added (as previously described) during the reaction itself, or preferably just at the completion of the co-condensation reaction and prior to cooling that would reduce the fluidity of the resin to the extent that the coloring material cannot be readily dispersed therein.

(7) It will also be appreciated that the coloring material may be added to the resins of this demonstration, and to the resins of each of the other demonstrations described herein, by dissolving the resin and the dye in a solvent therefor. For example, 100 grams of the resin in the case of each of the resins of the instant Demonstration A may be dissolved in 300 grams of acetone along with 0.5 grams of Rhodamine B Extra and 0.5 gram of Rhodamine 6GDN Extra. After a thorough dispersion, the acetone may be evaporated to obtain a friable resin product which may be reduced to a finely divided state to obtain a brightly colored pigment.

(8) It will also be appreciated that any of the resins described in the instant Demonstration A may be prepared initially as undyed resins, solidified, finely ground to pigment particle size and then have the desired coloring material or dye-stuff incorporated therein in a dye bath. For example, a dye bath may be prepared from a charge of 40 milliliters of water, 1 gram of isooctyl phenyl ether of polyethylene glycol ("Triton X-100," a commercially available surfactant), 10 milliliters of 90% formic acid, 0.5 gram of Rhodamine B Extra and 0.05 gram of Rhodamine 6GDN Extra, and a total of 5 grams of powdered clear resin, in the case of each of the resins obtained by carrying out the procedure of the first and second paragraphs of the instant Demonstration A, in finely divided form. The mixture is then heated to a temperature of about 45° C. to hasten the incorporation of the dye in the resin. After this the dyed resin is filtered from the bath, washed with cold water and dried to obtain a brilliantly colored pigment.

(9) It will also be appreciated that the conventional inorganic pigments (e.g., titanium dioxide) may be incorporated in the pigments of the invention. For example, a sample of any one of the clear resins described in the first and second paragraphs of this demonstration may be re-melted to 180–190° C. and (with or without the addition of any of the dyes hereinbefore described) 1–2% by weight of titanium dioxide pigment may be dispersed therein. The commercially available titanium dioxide pigments may be obtained in extremely minute particle size, so that subsequent grinding of the instant resin to a finely divided particulate condition suitable for conventional pigment use would result in particles of the resin matrix containing a plurality of very fine titanium dioxide particles therein. Other inorganic pigments may, likewise, be incorporated in the instant resin, or in any of the other resins described herein.

(10) The pigment particles obtained in previous Demonstrations (8) and (9), are each used in amounts corresponding to the product X-2 used in the previous Example 2 are employed in the procedure of Example 2; except that the heating with stirring is continued on up to substantially 195° C. Thereafter, the resulting dispersion X is cooled and dilution of the continuous phase thereof with the specific diluting solvents employed in Example 2 takes place. The resulting pigment in dispersion X is found to be in the form of dispersed discrete fine generally spheroidal or rounded particles. These coalescent-resistant particles are separated by the resultant agglutination and settling out which takes place as described in Example 2, after dilution and washing with the solvents employed therein.

(11) The procedure of Example 1 is carried out using as the product X the resins dyed in accordance with the procedure of paragraph (7) hereof. The dyeing of the dissolved resin may be carried out in solvent combinations, if desired, but the relative proportion of resin and solvent combination used should be that used in Example 1. The procedure is otherwise the same as Example 1, except that the heating and stirring is continued on up to about 180° C., and it is found that the resulting dispersion X has the previously described fine generally spheroidal pigment particles dispersed therein. The pigment particles are separated from the continuous phase film forming material by carrying out the dilution procedure previously described for Examples 1 and 2.

(12) A procedure is carried out that is substantially the same as that described in Example 1, except that product X of Example 1 is replaced by an equivalent portion of any one of the resins described herein in Demonstrations (A-1) through (A-6), i.e., with and without the dyes. The formation of the dispersion X in each case is carried out by continuing heating and stirring on up to substantially 190° C., and it is found that the resulting dispersed phase discrete finely divided generally spheroidal pigment particles are separated from the diluted continuous phase of the dispersion in the manner described in Example 1. The pigment particles obtained are readily re-dispersible finely divided pigment particles; which may also be converted to a free-flowing powdery pigment material before it is actually re-dispersed in a conventional ink or paint vehicle.

(13) In addition, it will be appreciated that the instant Demonstration (A) points out when the homogeneous reaction mass is obtained at about 90° to 100° C. in the form of an initial incompletely reacted condensate (and the dye may be added optionally at this time), such material will have essentially the incompletely reacted or incompletely condensed characteristics of product X actually used in Example 1 hereof. The replacement of the incompletely reacted condensate of Demonstration (A–1) for an equal amount of product X in Example 1, again carrying out the formation of the dispersion X by heating with stirring up to approximately 190° C., results in an extremely fine brightly colored pigment material. Which material is, in dispersion X, initially dispersed in coalescent-resistant condition (and not filterable or otherwise removable) but which, after dilution of the dispersion X in accordance with the procedure of Example 1, may be separated from the continuous liquid phase. The moist filter cake may be dried so as to obtain a powdery pigment particulate material that is readily re-dispersed into conventional paint and ink vehicles in order to obtain a dispersion of fine coalescent-resistant discrete solid particles and other characteristics previously obtained in the initial dispersion X of the instant paragraph. The moist filter cake may also be used to produce flushed colors and also may be re-dispersed into conventional paint and printing ink vehicles.

Additionally, each of the resins (A–2a), (A–2b) and (A–2c) described in the Demonstration (A–2) may be reacted first only to the initially incompletely reacted condensate stage, as described, to obtain generally homogeneous reaction mass at substantially 90°–100° C. In each case, such condensate may be used to replace the product X in the procedure of Example 1, again carrying heating with stirring of the dispersion up to substantially 190° C. before dilution and/or cooling in connection with the ultimate separation of the particulate pigment resin material, so as to obtain the superior results herein before described. In particular, the resulting pigment material obtained from the resins (A–2b) and (A–2c) are found to undergo the processing described in the instant paragraph to obtain superior results.

EXAMPLE 4

A charge of 200 grams of water and 10 grams of 91% paraformaldehyde is placed in a suitable reaction vessel and thoroughly mixed until the paraformaldehyde is dispersed therein, with heating to about 80° C. Next, a charge of 53 grams of monomethylol dimethyl hydantoin and 114 grams of a mixture of o- and p-toluenesulfonamide is added to the aqueous formaldehyde with stirring and heating up to about 100° C., until the ingredients are thoroughly dispersed therein to obtain a product X–4.

The use of the foregoing product X–4 in place of the corresponding proportions of product X used in Examples 1, 2 or 3 may be readily demonstrated to obtain the resultant superior particulate pigment material hereinbefore described. In demonstrating the use of the same in the procedure of Example 1, the heating of the dispersion is preferably carried out up to a temperature of at least 150° C., before dilution and cooling in the manner described in Example 1. In following the procedure of Example 2, the heating with stirring of the dispersion is preferably carried out up to a temperature of about 160° C., before treating the resulting dispersion X by dilution and decanting to separate the resulting particulate pigment material. In each case the particulate pigment material is found to have the superior properties hereinbefore described and is found to be readily re-dispersible in conventional ink and paint vehicles.

Demonstration B

Other embodiments of the cyclic ureido resin types are demonstrated as follows:

(B1) Comparable results to those obtained in the previous examples are obtained by using in that procedure a product X formed from 200 grams of water, 31 grams of 91% paraformaldehyde, 79 grams of monomethylol dimethyl hydantoin and 171 grams of paratoluenesulfonamide.

(B2) Comparable results are obtained by carrying out the procedure described in the previous paragraph, except that the ingredients used in the preparation of product X are 200 grams of water, 31.5 grams of 91% paraformaldehyde, 39.5 grams of monomethylol dimethyl hydantoin and 128.2 grams of paratoluenesulfonamide.

(B3) Comparable results are also obtained by using the procedure of the previous paragraph, wherein product X is formed by co-reacting in the manner just described 200 grams of water, 5 grams of borax decahydrate, 158 grams of monomethylol dimethyl hydantoin, 93.5 grams of benzoguanamine, 4.66 grams of Brilliant Yellow 6G base, 0.56 gram of Rhodamine 6 GDN and 1.40 grams of Rhodamine B Extra.

(B4) Comparable results are also obtained using product X prepared by co-reacting 200 grams of water, 5 grams of borax decahydrate, 158.1 grams of monomethylol dimethyl hydantoin, 93.5 grams of benzoguanamine, and 4 grams of 91% paraformaldehyde. The dye added is a total charge of 2.3 grams of Brilliant Yellow 6G base, 0.559 of Rhodamine 6 GDN and 1.398 grams of Rhodamine B Extra.

(B5) The procedure of the previous paragraph is repeated using, in the formation of product X, 200 grams of water, 5 grams of borax decahydrate, 22.6 grams of monomethylol dimethyl hydantoin, 4.6 grams of 91% paraformaldehyde, 122.1 grams of paratoluenesulfonamide, 31 grams of A-stage melamine-formaldehyde condensate, and 13.7 grams of 91% paraformaldehyde, in that order, with heating and stirring to disperse each of the ingredients before the next is added to obtain a product X which is a uniform reaction mixture at about 100° C.

(B6) A charge of 200 grams of water and 31 grams of 91% paraformaldehyde is thoroughly mixed until the paraformaldehyde is dispersed therein, at about 80° C. Next, a charge of 53 grams of monomethylol dimethyl hydantoin and 114 grams of a mixture of o- and p-toluenesulfonamide is added to the aqueous formaldehyde with stirring and heating up to about 100° C. until the ingredients are thoroughly dispersed therein to obtain a product X, which is dispersed in the vehicle X according to each of the procedures described in Example 1 to obtain fine sized particles (which are then separated in accordance with the aforesaid procedures).

EXAMPLE 5

A charge of 20 grams of water, 1 drop of 70.1% aqueous phosphorous acid, 0.3 gram of potassium tetraborate, 20 grams of 91% (active) paraformaldehyde, 18.5 grams of acetylene diurea, 6.5 grams of melamine, 44 grams of a mixture of o- and p-toluenesulfonamide, and 1.72 grams of Brilliant Yellow 6G base are stirred, while heat is added continuously until a temperature of 100° C. is reached, to obtain a generally homogeneous reaction mixture to form product X.

To the heated (i.e., 95–100° C.) product X is added a charge consisting of 85 grams of a continuous phase film forming vehicle X [formed of a blend of 187 grams of a 42.8% solids of styrenated copolymer resin (resin component of CYCOPOL 341–17) in Magic Oil 535 and 80 grams of vehicle resin S [2]], 0.67 gram of Rhodamine B Extra and 4.5 grams of Rhodamine dye paste Y [3], with stirring and continued heating to effect a uniform dispersion at about 95° C. (in about 2–3 minutes). The dispersion is then subjected to additional stirring and heat input over a period of about 15 to 20 minutes, until a temperature of 140° C. is attained, and then a charge of 3 grams of a polyethylene polymer (AC–6) and 5 grams of pale

---

[2] Vehicle resin S is 100% solids in the form of 10% styrenated alkyd (a semi-drying oil dehydrated castor oil-modified glycerol-phthalate) copolymer resin ("SCOPOL 41N").
[3] Dye paste Y is made by dispersing 33.3 parts of Rhodamine 6GDN in 23.2 parts of INKOL-O and 43.5 parts of the aforesaid vehicle resin S.

"H" linseed oil is added. Stirring and heating are continued until a temperature of 150° C. is reached and held briefly until escape of volatiles from the dispersion appears to have substantially discontinued. The dispersion is then allowed to cool to room temperature. It is found that the minute discrete solidified dispersed phase particles in the dispersion thus obtained have exceptional light stability and other superior optical characteristics.

The foregoing dispersion X has a continuous phase that is generally comparable to the continuous phase employed in previous Example 2. By using corresponding portions of the instant dispersion X in the procedure of Example 2, i.e., dilution of the continuous phase with the selective solvents described in Example 2, one obtains the separated particulate pigment material just described having the superior properties. On the other hand, by simply avoiding the addition of the polyethylene polymer and the linseed oil and continuing heating in the procedure of the instant example up to substantially 150° C. to carry out apparent completion of the co-condensation, one obtains a dispersion which has a continuous phase film forming material that is more easily "washed away" from the dispersed phase particular material by the dilution procedure already described in Example 2 hereof. After carrying out the dilution procedure of Example 2 with the last-mentioned dispersion X, one obtains a separated fine particulate pigment material (which may be dried or utilized as a moist filter cake; and is found to be readily re-dispersible in conventional paint and ink vehicles).

As a specific example of re-dispersion in a vehicle, a portion of the particulate separate pigment material just obtained (which corresponds substantially to the amount of product X used in the instant example) is employed in the vehicles that are described in the second paragraph hereof. It is found that the particulate pigment material, simply introduced in free-flowing powder form (in place of the previously mentioned product X heated to 95–100° C.) is readily re-dispersed in the continuous phase film forming vehicle X described in the second paragraph hereof). The temperatures employed during agitation are preferably about the same as those actually described in the second paragraph hereof. Although it is not absolutely necessary to employ temperatures that are this high because advancement of the condensation is no longer required and actual re-melting of the resin is not required in connection with the pigment particles. These particles are quite readily re-dispersed with rapid breakdown of the nominally agglutinated or clustered fine particle masses that may be included in the initially formed separated particular pigment material.

EXAMPLE 6

A charge of 30 grams of a 44% styrenated-alkyd resin in INKOL-O, 40.8 grams paratoluenesulfonamide, 1 gram of Brilliant Yellow 6G base, 0.17 gram of Rhodamine 6G and 0.3 gram of Rhodamine B Extra are heated with stirring, in a disperser up to 140° C. Then a charge of 8.4 grams of A-stage unmodified melamine-formaldehyde condensate (Resimene 814) is slowly added and the temperature is allowed to drop to 120° C., at which time 7.6 grams of (95% active) paraformaldehyde is slowly added. The resultant mixture is heated with continued agitation to about 170° C. and held for 10 minutes until the dispersion is complete. The resulting dispersion X is diluted in the proportions and pursuant to the procedure of Example 2 hereof to obtain comparable results in a recovered separated particulate pigment material. In this procedure, it is believed that there is a rapid initial reaction between molten dispersed phase components (each of which is immiscible with the continuous phase) to form a molten product X in situ as a substantially water insoluble incompletely condensed (A-stage) aromatic amide-aldehyde reaction product, which, in turn, goes through advancement of condensation to form in situ the desired fine coalescent-resistant dispersed phase particles.

From a study of the foregoing examples and demonstrations, it will be apparent that the pigment particles may be formed from a variety of constituents (a), (b), (c) and/or (d) identified herein. For sake of brevity and convenience, the reaction product of these constituents is referred to as (x) a water-insoluble amide-aldehyde condensation product and will be understood to include the various actual reaction products formed from constituents (a), (b), (c), and/or (d). It will also be noted that various continuous phase film forming liquefied vehicles are utilized in the formation of the submicron substantially uniformly sized particles. These continuous phase film forming vehicles (resins) are substantially water-free and impart viscosity to the reaction mixture that permits or causes shearing and the like to take place so that the desired uniformity of particle size is attained. For sake of brevity and convenience, the continuous phase film forming synthetic resinous material is referred to as (y) a liquefied vehicle immiscible with product (x). Further, the agglutination-inducing vehicle is selected from a relatively wide range of substantially aliphatic hydrocarbon vehicles or a mixture of such vehicles. The proper agglutination-inducing vehicle or mixture of vehicles (hereinafter referred to simply as vehicles) must either have an effective KB value in the range of 25 to 40 or possess sufficient solvation power to prevent the continuous phase film forming vehicle from precipitating from the mixture while allowing the pigment particles to flocculate or otherwise form larger masses that can be separated from the mixture. Of course, suitable agglutination-inducing vehicles must not permanently destroy the desired characteristics of the submicron coalescent-resistant pigment particles. The separated revertibly-coalescent pigment particles are utilizable in ink and paint vehicles as moist dust-free filter cakes. During the dispersion of a filter cake in ink and/or paint vehicles such adherent vehicles may be "split-off" from the pigment particles and removed from the system. Of course, the separated particles may be used to produce flushed colors and/or may also be dried and used as a free-flowing powder. In that instance, some of the continuous phase film forming vehicle (y) appears to form a molecular-type layer around each particle. This layer of vehicle (y) on the dried pigment particles may be "split-off" during the formation of a desired ink or paint; however, in any event, only about 5% by weight of vehicle (y) adheres to the separated pigment particles.

It will also be appreciated that the instant pigment particles may be formed without having a selective light-absorbing agent therein, but adapted to incorporate such light-absorbing agent at a later time. For sake of convenience, such light-absorbing agents, i.e., dyes, coloring agents, pigments, daylight fluorescent dyes, etc. are simply referred to as (z) a selective light-absorbing agent. Of course, the pigment particles may also be formed and separated containing the desired light-absorbing agent (z), i.e., a fluorescent dye.

In summation, it will be seen that the invention provides a novel method of separating submicron pigment particles from base vehicles and the hereinbefore described pigment particles. The separated revertibly-coalescent pigment particles are utilized in moist filter cake form, as flushed colors or are dried and converted into free-flowing pulverulent material composed of substantially uniform spheroidal submicron particles. The pigment particles per se have been produced in accordance with the aforesaid parent applications but were not separable or available without the continuous phase film forming material. The instant invention now provides such uniform submicron spheroidal particles substantially without the continuous phase material. Although, as previously pointed out hereinbefore, some nominal amount (i.e., about 5% by weight) of the continuous phase resin appears to stay with the separated pigment; apparently primarily as a molecular layer around the pigment particles, such minor or nominal amounts do not interfere with the intended use of the pigment particles.

The pigment particles are formed in a continuous phase film forming resin wherein during formation nominal agitation and time-temperature conditions cause the formation of extremely uniform submicron size coalescent-resistant particles. Then an agglutination-inducing liquefied vehicle is added which temporarily alters the coalescent-resistant characteristic allowing the substantial separation of the solid particles (or at least a portion thereof) from the vehicles (both the continuous phase vehicle and the agglutination-inducing vehicle) by a physical-chemical mechanism that is not fully understood. The agglutination-inducing vehicle can be completely removed from the pigment particle, as by volatilization thereof, but preferably the moist pigment particles are used to produce flushed colors.

What is claimed is:

1. A method of separating a finely particulate material from a vehicle comprising (1) bringing into initial contact as dispersible phase (x) a water-insoluble amide-aldehyde condensation product in a liquefied state and as a continuous phase (y) a liquefied resinous film forming vehicle immiscible with said (x) product: (2) subjecting the resultant liquefied mixture to agitation and time-temperature conditions sufficient to effect the formation of discrete finely divided substantially uniformly sized generally rounded solid particles characterized essentially by coalescent-resistance under ambient conditions; (3) intermixing an agglutination-inducing liquefied vehicle having an effective Kauri-Butanol value in the range of about 25 to 40 and being substantially soluble with said (y) liquefied vehicle and substantially insoluble with said particles to produce a mixture of said vehicles and revertibly-coalescent particles; and (4) separating at least a portion of the revertibly-coalescent particles from said vehicles whereby said separated particles are solids that are readily dispersible in a solid-film-forming continuous phase liquid ink and paint vehicle as a substantally insoluble dispersed phase in substantially the aforesaid finely divided discrete essentially coalescent-resistant solid condition.

2. The method as defined in claim 1, wherein the effective Kauri-Butanol value of the agglutination-inducing liquefied vehicle is in the range of 30 to 32.

3. The method as defined in claim 1, wherein the agglutination-inducing liquefied vehicle is selected from the group consisting essentially of hexane, mineral spirits, isoparaffinic petroleum fractions, naphthenic oils and mixtures thereof.

4. The method as defined in claim 1, wherein (z) a selective light-absorbing agent is introduced into the liquefied mixture of (x) and (y), said light-absorbing agent being selectively absorbable by the (x) product and retainable in said (x) product substantially preventing said agent from migration into the (y) liquefied vehicle.

5. The method as defined in claim 4, wherein the light-absorbing agent is at least one dye.

6. The method as defined in claim 4, wherein the light-absorbing agent is at least one daylight fluorescent dye in a concentration effective for daylight fluorescence.

7. The method as defined in claim 1, wherein the amide-aldehyde condensation product (x) is initially an incompletely reacted condensation reaction product and substantial advancement of such condensation reaction is effected during step (2) to effect formation of the discrete finely divided substantially uniform size solid particles.

8. The method as defined in claim 7, wherein the amide-aldehyde condensation product (x) is in a molten state in step (1).

9. The method as defined in claim 8, wherein step (2) involves advancement of the condensation reaction at temperatures substantially in the range of 120° to 175° C.

10. The method as defined in claim 9, wherein the advancement of the condensation reaction is carried out within molten dispersed phase globules in step (2) while the continuous phase film forming vehicle (y) has a viscosity sufficient to shear such globules into discrete rounded submicron substantially uniformly sized particulate form.

11. The method as defined in claim 1, wherein the amide-aldehyde condensation product (x) is a condensate of formaldehyde and a resin-former whose molecule contains a plurality of heterocyclic —NH— groups wherein each N atom is connected directly by a single bond to a C atom which in turn is connected directly by a double bond to an atom selected from the class consisting of O, S and N.

12. The method as defined in claim 1, wherein the liquefied film forming vehicle (y) contains at least 40% solids by weight for increased viscosity and shearing capacity in step (2).

13. The method as defined in claim 1, wherein the liquefied film forming vehicle (y) contains at least 50% solids by weight for increased viscosity and shearing capacity in step (2).

14. The method as defined in claim 1, wherein step (4) includes separation of the revertibly-coalescent particles by filtration.

15. The method as defined in claim 1, wherein the amide-aldehyde condensation product (x) is an aromatic amide-aldehyde condensate in step (1).

16. The method as defined in claim 15, wherein the amide-aldehyde condensation product (x) is an A-stage condensate in step (1).

17. The method as defined in claim 16, wherein the amide-aldehyde condensation product (x) is a thermoplastic resin in step (3).

18. The method as defined in claim 16, wherein the amide-aldehyde condensation product (x) is a thermosetting resin in step (3).

19. The method as defined in claim 16, wherein the amide-aldehyde condensation product (x) is a thermoset resin in step (3).

20. The method as defined in claim 1, wherein steps (1) and (2) are carried out at least in part concurrently.

21. The method as defined in claim 1, wherein steps (2) and (3) are carried out at least in part concurrently.

22. The method as defined in claim 1, wherein the condensation product (x) is formed substantially of a monoaromatic monosulfonamide-acetylene urea-formaldehyde condensation product and the continuous phase film forming vehicle (y) is formed of a synthetic resinous material.

23. The method as defined in claim 1, wherein step (2) results in dispersed phase particles of extremely fine size in a substantially water-free dispersion of an organic film forming continuous liquid phase tending to stabilize the dispersion and resist separation of the dispersed phase particles therefrom and step (3) comprises intermixing said continuous phase with a compatible substantially anhydrous organic agglutination-inducing liquid specifically adapted to dissolve at least a portion of said continuous phase and substantially remove the same from the surface of said dispersed phase particles insoluble in such agglutination-inducing liquid so as to effect temporary agglutination of such particles to facilitate separation thereof from said dispersion and separating at least a portion of such particles to obtain dispersed phase particles capable of the re-dispersion specified in claim 1.

24. The method as defined in claim 1, wherein step (4) includes washing the revertibly-coalescent particles with amounts of the agglutination-inducing vehicle.

25. The method as defined in claim 1, wherein the agglutination-inducing vehicle is a mixture of such vehicles.

26. A method of separating discrete finely divided particulate material adapted for use as a carrier for selective light-absorbing agents in inks and paints, comprising the steps of (1) providing an admixture of (x), as a dispersible phase, a water-insoluble amide-aldehyde condensation product in a liquefied state and (y), as a continuous phase for (x) a liquefied substantially water-free viscosity inducing film forming vehicle immiscible with (x); (2) subjecting said admixture of phases to agitation and time-temperature conditions sufficient to effect the formation of discrete, finely divided, generally rounded and uniform sized solid particles characterized essentially by coalescent-resistance under ambient conditions; and (3) separating at least a portion of said particles by intermixing with said admixture a quantity of a nonaqueous agglutination-inducing vehicle having sufficient effective solvation power to maintain said continuous phase vehicle (y) therewith while allowing said particles to assume a revertibly-coalescent characteristic facilitating their removal therefrom in the form of substantially insoluble coalescent-resistant particles which are readily redispersible in a solid-film-forming organic continuous phase liquefied ink and paint vehicle while maintaining the aforesaid form.

27. The method as defined in claim 26, wherein the agglutination-inducing vehicle has an effective Kauri-Butanol value of about 25 to 40.

28. The method as defined in claim 26, wherein the viscosity inducing vehicle (y) has at least substantially 40% solids content by weight.

29. The pigment particles in accordance with the method of claim 26.

30. Pigment particles adapted as carriers for selective light-absorbing agents in inks and paints having coalescent-resistant characteristics in such inks and each of said pigment particles comprising a solidified amide-aldehyde condensation product formed by (1) admixing (x), as a dispersible phase, a water-insoluble amide-aldehyde condensation product in a liquefied state and (y), as a continuous phase for (x) a liquefied substantially water-free viscosity inducing resinous film forming vehicle immiscible with (x) to form an admixture thereof which is subject to agitation and time-temperature conditions sufficient to effect the formation of discrete, finely divided, generally rounded and uniformly sized solid particles characterized essentially by coalescent-resistance and optical clarity and (2) separating said particles from said admixture by intermixing an agglutination-inducing liquefied vehicle having an effective Kauri-Butanol value in the range of about 25 to 40 and being substantially soluble with the continuous phase and substantially insoluble with the dispersed phase in an amount sufficient to produce a mixture of vehicles and revertibly-coalescent particles which are readily re-dispersible in ink and paint vehicles.

References Cited
UNITED STATES PATENTS
2,776,267  1/1957  Weber et al. _____ 260—21

TOBIAS E. LEVOW, Primary Examiner

A. P. DEMERS, Assistant Examiner

U.S. Cl. X.R.

106—309; 252—308, 309, 314; 260—21, 29.1 R, 34.2, 37 N, 38, 39 P, 40 R, 45.3, 67.5, 676 R, 67.6 C

UNITED STATES PATENT OFFICE
CERTIFICATE OF CORRECTION

Patent No. 3,642,650          Dated February 15, 1972

Inventor(s) Maurice Dwight McIntosh, Deceased, Late of Willoughby, Ohio, by Central National Bank, Executor.

It is certified that error appears in the above-identified patent and that said Letters Patent are hereby corrected as shown below:

Col. 7, line 5, correct the formula as follows:

(VIII)... Cyclohexyl hydantoin.... 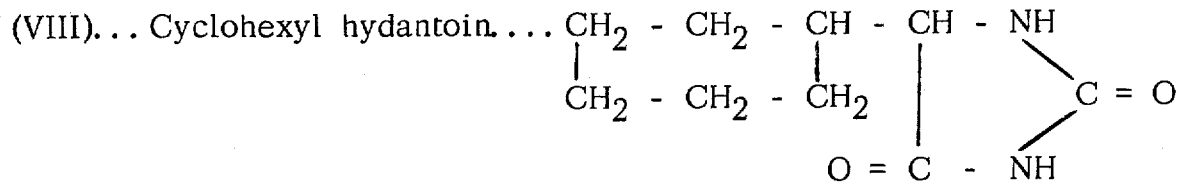

Col. 8, line 59, cancel "and" and insert --are--.

Col. 10, line 5, correct the formula as follows:

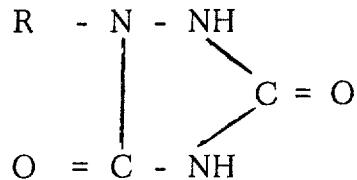

Col. 12, line 16, cancel "flyoxal" and insert therefor --glyoxal--.

UNITED STATES PATENT OFFICE
CERTIFICATE OF CORRECTION

Patent No. 3,642,650      Dated February 15, 1972

Inventor(s) Maurice Dwight McIntosh, Deceased, Late of Willoughby, Ohio, by Central National Bank, Executor.

It is certified that error appears in the above-identified patent and that said Letters Patent are hereby corrected as shown below:

Cols. 13 and 14, cancel formula (XXIXm) as it appears and insert the following:

(XXIXm)... 7-phenyl acetylene urea...

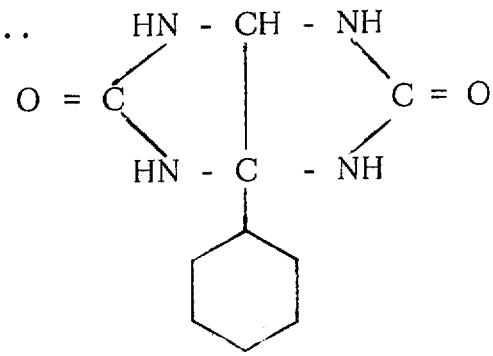

From phenyl glyoxal

Cols. 13 and 14, cancel formula (XXXIXn) as it appears and insert the following:

(XXIXn)... 7-methyl acetylene urea...

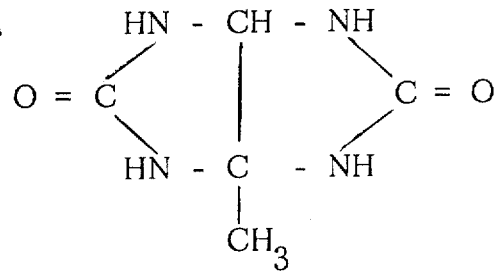

From methyl glyoxal

UNITED STATES PATENT OFFICE
CERTIFICATE OF CORRECTION

Patent No. 3,642,650          Dated February 15, 1972

Inventor(s) Maurice Dwight McIntosh, Deceased, Late of Willoughby, Ohio, by Central National Bank, Executor It is certified that error appears in the above-identified patent and that said Letters Patent are hereby corrected as shown below:

Cols. 13 and 14, cancel formula (XXIXo) as it appears and insert the following:

(XXIXo)... 7-methyl-8-ethyl acetylene urea...

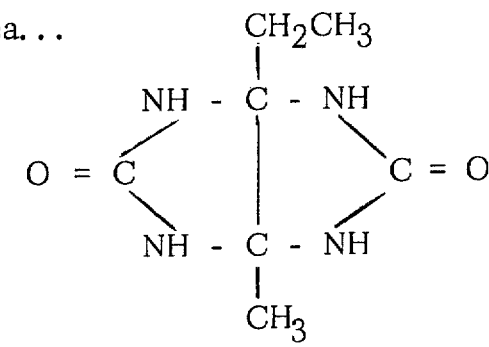

From methyl ethyl glyoxal

Cols. 13 and 14, cancel formula (XXIXp) as it appears and insert the following:

(XXIXp)... 7-methyl-8-amyl acetylene urea...

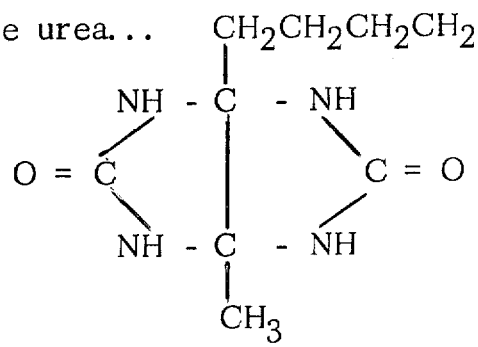

From methyl amyl glyoxal

UNITED STATES PATENT OFFICE
CERTIFICATE OF CORRECTION

Patent No. 3,642,650  Dated February 15, 1972

Inventor(s) Maurice Dwight McIntosh, Deceased, Late of Willoughby, Ohio by Central National Bank, Executor.

It is certified that error appears in the above-identified patent and that said Letters Patent are hereby corrected as shown below:

Col. 15, line 21, cancel formula (XXIXs) as it appears and insert the following:

(XXIXs)... Bis-(7-methylene-acetylene urea)...

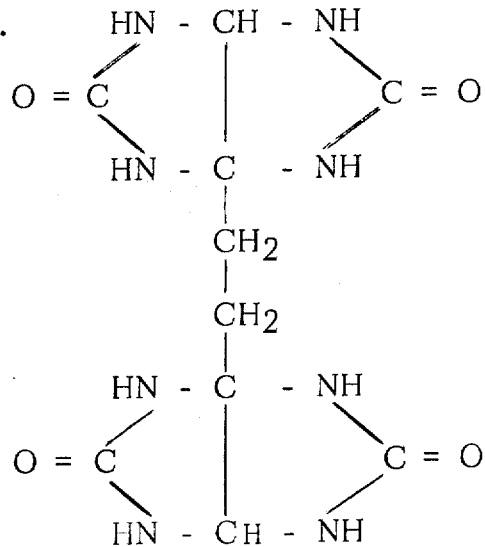

From diglyoxal ethane with a total of four mols of urea

Col. 15, line 41, cancel "ing the definition of ingredient (b) may be used, instead" and insert therefor --ingredients (c) and (d) which will be defined in greater--.

Col. 23, line 6, cancel "1-alkyl" and insert --1-allyl--.

Signed and sealed this 3rd day of July 1973.

(SEAL)
Attest:

EDWARD M. FLETCHER, JR.
Attesting Officer

Rene Tegtmeyer
Acting Commissioner of Patents